US008284094B2

(12) United States Patent
Hamai et al.

(10) Patent No.: US 8,284,094 B2

(45) Date of Patent: Oct. 9, 2012

(54) WIRELESS CONTROL SYSTEM

(75) Inventors: Shinji Hamai, Osaka (JP); Yasushi Kojima, Osaka (JP); Junji Yoshida, Osaka (JP)

(73) Assignee: Panasonic Corporation, Osaka (JP)

( * ) Notice: Subject to any disclaimer, the term of this patent is extended or adjusted under 35 U.S.C. 154(b) by 199 days.

(21) Appl. No.: 12/864,749

(22) PCT Filed: Jan. 30, 2009

(86) PCT No.: PCT/JP2009/000361

§ 371 (c)(1),
(2), (4) Date: Jul. 27, 2010

(87) PCT Pub. No.: WO2009/096191

PCT Pub. Date: Aug. 6, 2009

(65) Prior Publication Data

US 2010/0315279 A1 Dec. 16, 2010

(30) Foreign Application Priority Data

Jan. 30, 2008 (JP) ................................ 2008-018687
Feb. 20, 2008 (JP) ................................ 2008-038920

(51) Int. Cl.
*G08C 19/12* (2006.01)
*H04N 5/44* (2011.01)

(52) U.S. Cl. ...................................... 341/176; 348/734

(58) Field of Classification Search ................ 340/5.61, 340/825.69; 341/176; 348/734
See application file for complete search history.

(56) References Cited

U.S. PATENT DOCUMENTS 6,369,693 B1 4/2002 Gibson
6,437,836 B1 * 8/2002 Huang et al. .................. 348/734
7,039,033 B2 5/2006 Haller et al.
2005/0157668 A1 7/2005 Sivan
2006/0085579 A1 4/2006 Sato
2008/0253772 A1 10/2008 Katsuyama

FOREIGN PATENT DOCUMENTS

JP 9-504420 4/1997
JP 9-215064 8/1997
JP 10-164673 6/1998

(Continued)

OTHER PUBLICATIONS

International Search Report issued May 12, 2009 in International (PCT) Application No. PCT/JP2009/000361.

*Primary Examiner* — Steven J Mottola

(74) *Attorney, Agent, or Firm* — Wenderoth, Lind & Ponack, L.L.P.

(57) ABSTRACT

To easily ensure that appropriate recognition information is used. A remote control system (1) includes a DVR (13) and a remote control (11) that controls the DVR (13) via a wireless communication path. The remote control (11) which is one apparatus out of the DVR (13) and the remote control (11) obtains, by a wireless reception unit (114), recognition information used by the apparatus to uniquely recognize the other apparatus, via another communication path (a communication path through a TV (12)) different from the wireless communication path connecting the apparatus and the other apparatus. When a connected apparatus recognized via the wireless communication path is identified by the obtained recognition information, the remote control (11) sets, by a control circuit (115), the connected apparatus as the DVR (13) which is the other apparatus to enable communication with the connected apparatus.

10 Claims, 15 Drawing Sheets

FOREIGN PATENT DOCUMENTS

| | | |
|---|---|---|
| JP | 2001-258082 | 9/2001 |
| JP | 2002-44764 | 2/2002 |
| JP | 2002-64883 | 2/2002 |
| JP | 2002-73565 | 3/2002 |
| JP | 2006-115196 | 4/2006 |
| JP | 2008-263308 | 10/2008 |
| WO | 96/06499 | 2/1996 |

* cited by examiner

FIG. 6

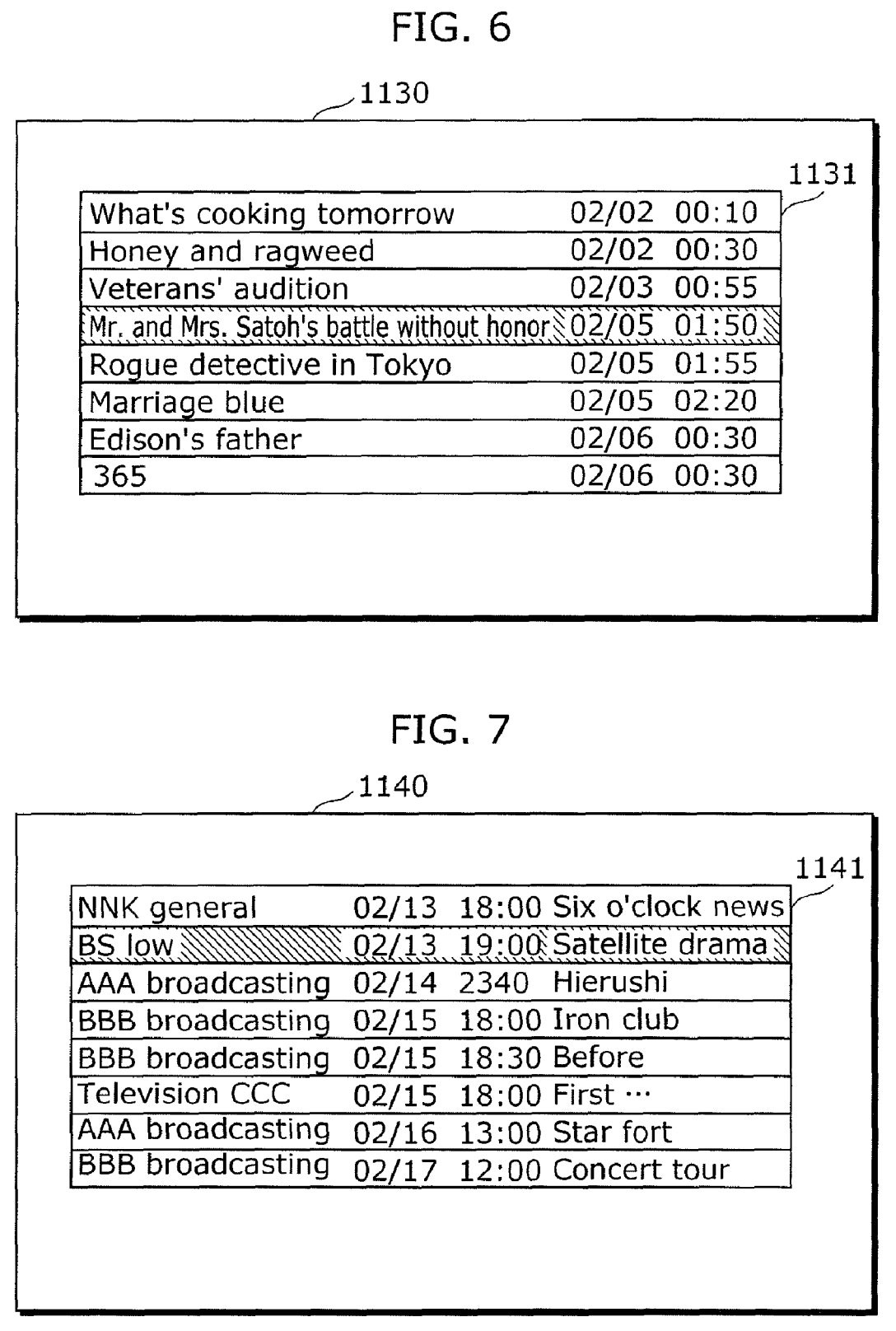

1130

1131

| | | |
|---|---|---|
| What's cooking tomorrow | 02/02 | 00:10 |
| Honey and ragweed | 02/02 | 00:30 |
| Veterans' audition | 02/03 | 00:55 |
| Mr. and Mrs. Satoh's battle without honor | 02/05 | 01:50 |
| Rogue detective in Tokyo | 02/05 | 01:55 |
| Marriage blue | 02/05 | 02:20 |
| Edison's father | 02/06 | 00:30 |
| 365 | 02/06 | 00:30 |

FIG. 7

1140

1141

| | | | |
|---|---|---|---|
| NNK general | 02/13 | 18:00 | Six o'clock news |
| BS low | 02/13 | 19:00 | Satellite drama |
| AAA broadcasting | 02/14 | 2340 | Hierushi |
| BBB broadcasting | 02/15 | 18:00 | Iron club |
| BBB broadcasting | 02/15 | 18:30 | Before |
| Television CCC | 02/15 | 18:00 | First ··· |
| AAA broadcasting | 02/16 | 13:00 | Star fort |
| BBB broadcasting | 02/17 | 12:00 | Concert tour |

WIRELESS CONTROL SYSTEM

TECHNICAL FIELD

The present invention relates to a wireless control system including a controlled apparatus and a wireless controlling apparatus that controls the controlled apparatus via a wireless communication path. In detail, the present invention relates to the wireless control system in which one of the controlled apparatus and the wireless controlling apparatus, when a connected apparatus connected via the wireless communication path is identified by recognition information, sets the connected apparatus as the other apparatus to enable communication with the connected apparatus.

BACKGROUND ART

Conventionally, there is a wireless control system including a controlled apparatus and a wireless controlling apparatus that controls the controlled apparatus via a wireless communication path. For example, the wireless controlling apparatus recognizes the controlled apparatus. After the recognition, information such as an identifier is exchanged between the wireless controlling apparatus and the controlled apparatus. In a state where the information exchange has already been performed, the wireless controlling apparatus transmits a command to the controlled apparatus. Upon receiving the command, the controlled apparatus operates according to the command. In other words, in the wireless control system, one of the wireless controlling apparatus and the controlled apparatus recognizes the other apparatus, that is, one of the wireless controlling apparatus and the controlled apparatus detects the other apparatus. After this recognition, information such as an identifier is exchanged between the wireless controlling apparatus and the controlled apparatus in the wireless control system. This information exchange enables data communication between the wireless controlling apparatus and the controlled apparatus in the wireless control system. After the information exchange, data communication is performed in the wireless control system, where the wireless controlling apparatus transmits a command to the controlled apparatus and the controlled apparatus receives the transmitted command. The controlled apparatus then operates according to the received command. Note that the recognition mentioned above means that the controlled apparatus is detected simply as a target to be controlled by the wireless controlling apparatus, in a state where actual data communication with the wireless controlling apparatus is still impossible.

Conventionally, a controlling apparatus that remotely controls a controlled apparatus such as a TV, namely, a remote control, transmits a command using infrared radiation. In recent years, attention is given to control via a wireless communication path of radio waves instead of infrared radiation.

Since the wireless communication path of radio waves typically does not have directionality, usually the controlled apparatus and the remote control each register an ID of the other apparatus and respond only to a packet having the registered ID, in order to avoid interference with a neighboring apparatus of the same type. This ID exchange/registration is called pairing. A MAC address is typically used as the ID.

A method of the ID exchange is described below. The controlled apparatus and the remote control are each provided with a switch for exchanging IDs. To perform pairing, the user presses the switches on the controlled apparatus and the remote control approximately at the same time.

When the switch on the controlled apparatus is pressed, the controlled apparatus transmits a remote control search packet including a MAC address of the controlled apparatus, by broadcasting.

When the switch on the remote control is pressed, the remote control enters a remote control search packet reception wait state. Upon receiving the remote control search packet, the remote control returns a response including a MAC address of the remote control, to the MAC address of the controlled apparatus included in the packet. Thus, the MAC addresses are exchanged.

There is also a situation where one remote control controls a plurality of controlled apparatuses. In such a case, the user performs ID exchange between the remote control and each controlled apparatus to be controlled by the remote control from among the plurality of controlled apparatuses. Take a remote control that controls a TV and a Digital Video Recorder (DVR) as controlled apparatuses, for example. The remote control includes keys for controlling the TV such as channel change keys, keys for controlling the DVR such as a play key and a fast forward key, and also switch keys for switching the control between the TV and the DVR and arrow keys for controlling a GUI displayed on the TV. By switching the operated apparatus using the switch keys provided on the remote control, the user can operate the TV and the DVR with one remote control (for example, see Patent Reference 1).

Moreover, there is the following pairing method. A controlling apparatus communicates with a desired controlled apparatus using infrared radiation having directionality, thereby specifying the controlled apparatus. Subsequently, the controlling apparatus communicates with the controlled apparatus using a wireless communication path of radio waves (for example, see Patent Reference 2).

Patent Reference 1: Japanese Unexamined Patent Application Publication No. 9-504420

Patent Reference 2: Japanese Unexamined Patent Application Publication No. 2001-258082

DISCLOSURE OF INVENTION

Problems that Invention is to Solve

However, in the conventional method, when controlling a plurality of controlled apparatuses, it is necessary to press pairing switches provided on the plurality of controlled apparatuses. This causes inconvenience to the user.

Besides, when switching a controlled apparatus to be controlled by the remote control, the user not only needs to press a button composed of a switch and the like corresponding to the switching operation, but also needs to know appropriately which controlled apparatus the user is operating with the remote control. For example, in the case of controlling a TV and a DVR by one remote control, the user controls the TV or the DVR on the basis of information of a moving image or a still image displayed on the TV. When the moving image or the still image displayed on the TV is outputted from a main unit of the TV, the user needs to control the TV. When the moving image or the still image displayed on the TV is outputted from a main unit of the DVR, the user needs to control the DVR. However, such a distinction cannot be made with only the information displayed on the TV, and so the user is required to remember a previous operation performed by the remote control. Furthermore, even in the case where the user knows the previous operation, after a third party performs an operation using another remote control or the main unit of the TV or the DVR, an actual operation may contradict with an operation intended by the user.

The present invention has been made in view of the above problems. A first object of the present invention is to provide a wireless controlling apparatus that enables automatic pairing between a controlling apparatus and a plurality of controlled apparatuses. A second object of the present invention is to provide a wireless controlling apparatus that can appropriately switch between the plurality of controlled apparatuses paired with the controlling apparatus.

On the other hand, in the technique described in Patent Reference 2, when operating a TV, it is necessary to perform presetting of exchanging communication-related information in advance so that the TV to be operated can identify a specific remote control apparatus. Moreover, when switching to another TV which the user wants to operate with the same remote control apparatus, the user needs to perform presetting again for this switching target TV.

It is inconvenient and time-consuming to perform such presetting of exchanging communication information before operating the TV. In addition, a failure to exchange appropriate communication-related information during presetting leads to a problem that all TVs present in a range where an omnidirectional communication medium is transmittable malfunction.

The present invention has been made in view of this problem. A third object of the present invention is to provide an identification method, a remote control apparatus, a reception apparatus, and a wireless remote control system whereby a reception apparatus present within a range of sight of the user can automatically identify a remote control apparatus without initial installation/setup or switching operation.

In detail, conventionally there is a wireless control system including a controlled apparatus and a wireless controlling apparatus that controls the controlled apparatus via a wireless communication path. In the wireless control system, one of the controlled apparatus and the wireless controlling apparatus, when a connected apparatus connected via the wireless communication path is identified by recognition information that is used by the apparatus to uniquely recognize the other apparatus, sets the connected apparatus as the other apparatus to enable communication with the connected apparatus. This makes it possible to prevent a situation where an inappropriate apparatus which is not the controlled apparatus is controlled by the wireless controlling apparatus, thereby ensuring that only the controlled apparatus is controlled.

Note that the wireless control system may include not only a first controlled apparatus which is controlled by the wireless controlling apparatus but also a second controlled apparatus which is equally controlled by the wireless controlling apparatus. As an example, the first and second controlled apparatuses are a TV and a DVR, where the TV and the DVR are connected to each other. Conventionally, the connection between these two controlled apparatuses is used for a purpose that is irrelevant to the communication for controlling the first controlled apparatus by the wireless controlling apparatus and the communication for controlling the second controlled apparatus by the wireless controlling apparatus.

Meanwhile, the wireless communication path between the controlled apparatus and the wireless controlling apparatus can be selected from a plurality of different types of wireless communication paths such as a wireless communication path of infrared radiation and a wireless communication path of radio waves. One of the plurality of types of possible wireless communication paths is selected as the wireless communication path to be implemented. Here, the control by the wireless controlling apparatus can be realized as long as one type of wireless communication path is implemented. Even if another type of wireless communication path is provided in addition to this type of wireless communication path, the additional wireless communication path is useless. Therefore, the addition of another wireless communication path to provide a plurality of wireless communication paths is not performed conventionally.

However, in the wireless control system, appropriate recognition information needs to be used as the recognition information when setting the connected apparatus as the other apparatus to enable communication with the connected apparatus, in order to prevent a situation where an inappropriate apparatus other than the controlled apparatus is controlled as the connected apparatus by the wireless controlling apparatus via the wireless communication path. This requires, for example, the above-mentioned pairing switches (keys) and the user operation of the switches. Thus, the use of appropriate recognition information cannot be ensured easily.

The present invention has been made in view of this point. A fourth object of the present invention is to easily ensure the use of appropriate recognition information. This makes it easier to prevent a situation where an inappropriate apparatus is controlled by the wireless controlling apparatus, thereby easily ensuring that only the controlled apparatus is controlled.

Means to Solve the Problems

To solve the stated problems, a wireless control system according to the present invention is a wireless control system including: a controlled apparatus; and a wireless controlling apparatus that controls the controlled apparatus via a wireless communication path, wherein one of the controlled apparatus and the wireless controlling apparatus obtains recognition information for uniquely recognizing an other one of the controlled apparatus and the wireless controlling apparatus, via a communication path different from the wireless communication path connecting the apparatus and the other apparatus, and when a connected apparatus recognized via the wireless communication path is identified by the obtained recognition information, the apparatus sets the connected apparatus as the other apparatus to enable communication with the connected apparatus.

Here, for example, the wireless control system may include: a first controlled apparatus; and a second controlled apparatus, wherein the first controlled apparatus has first recognition information which is recognition information used by a communication apparatus different from the first controlled apparatus to uniquely recognize the first controlled apparatus, the second controlled apparatus has second recognition information which is recognition information used by a communication apparatus different from the second controlled apparatus to uniquely recognize the second controlled apparatus, the second controlled apparatus outputs the second recognition information to the first controlled apparatus when the first controlled apparatus and the second controlled apparatus are connected to each other, in a case where the wireless controlling apparatus is able to communicate with the first controlled apparatus according to the first recognition information, the first controlled apparatus outputs the second recognition information to the wireless controlling apparatus, the wireless controlling apparatus enables communication with the second controlled apparatus recognized via the wireless communication path, according to the second recognition information outputted from the first controlled apparatus, and the different communication path is composed of two communication paths that are a communication path between the first controlled apparatus and the second controlled apparatus and the wireless communication path between the first controlled apparatus and the wireless controlling apparatus.

Moreover, for example, in the wireless control system, the controlled apparatus may identify the wireless controlling apparatus, wherein the wireless controlling apparatus includes: a first transmission unit that transmits recognition information indicating the wireless controlling apparatus via a first communication medium transmittable only within a range of sight, upon detecting that an operation of a button provided on the wireless controlling apparatus is performed; and a second transmission unit that transmits the recognition information and operation information for operating the controlled apparatus, via a second communication medium, the controlled apparatus includes: a first obtainment unit that obtains the recognition information transmitted from the wireless controlling apparatus via the first communication medium; a second obtainment unit that obtains the recognition information transmitted from the wireless controlling apparatus via the second communication medium; and a recognition information determination unit that determines whether or not the recognition information obtained by the first obtainment unit and the recognition information obtained by the second obtainment unit match, thereby identifying a transmitter, and the different communication path is a communication path that has the first communication medium as a communication medium.

Effects of the Invention

According to the present invention, it is possible to provide a wireless control system in which pairing can be automatically performed between a controlling apparatus and a plurality of controlled apparatuses and the plurality of controlled apparatuses paired with the controlling apparatus can be switched appropriately.

According to the present invention, even in a situation where, for example, a plurality of wireless controlling apparatuses transmit operation information to a controlled apparatus, the controlled apparatus can automatically recognize only the target remote control apparatus, with there being no need for the user to perform presetting such as a switching operation or installation/setup for enabling the controlled apparatus to specify the wireless controlling apparatus.

Moreover, in this wireless control system, one apparatus obtains recognition information via another communication path different from a wireless communication path connecting the apparatus and the other apparatus. When a connected apparatus is identified by the obtained recognition information, the apparatus sets the connected apparatus as the other apparatus to enable communication with the connected apparatus. By obtaining the recognition information via another communication path, the use of appropriate recognition information can be ensured easily. This makes it easier to prevent a situation where an inappropriate apparatus is controlled by the wireless controlling apparatus, thereby easily ensuring that only the controlled apparatus is controlled.

BRIEF DESCRIPTION OF DRAWINGS

FIG. 6 is a view showing a menu layout of a content list in the embodiment A of the present invention.

FIG. 7 is a view showing a menu layout of a recording schedule list in the embodiment A of the present invention.

NUMERICAL REFERENCES

Figure 1:
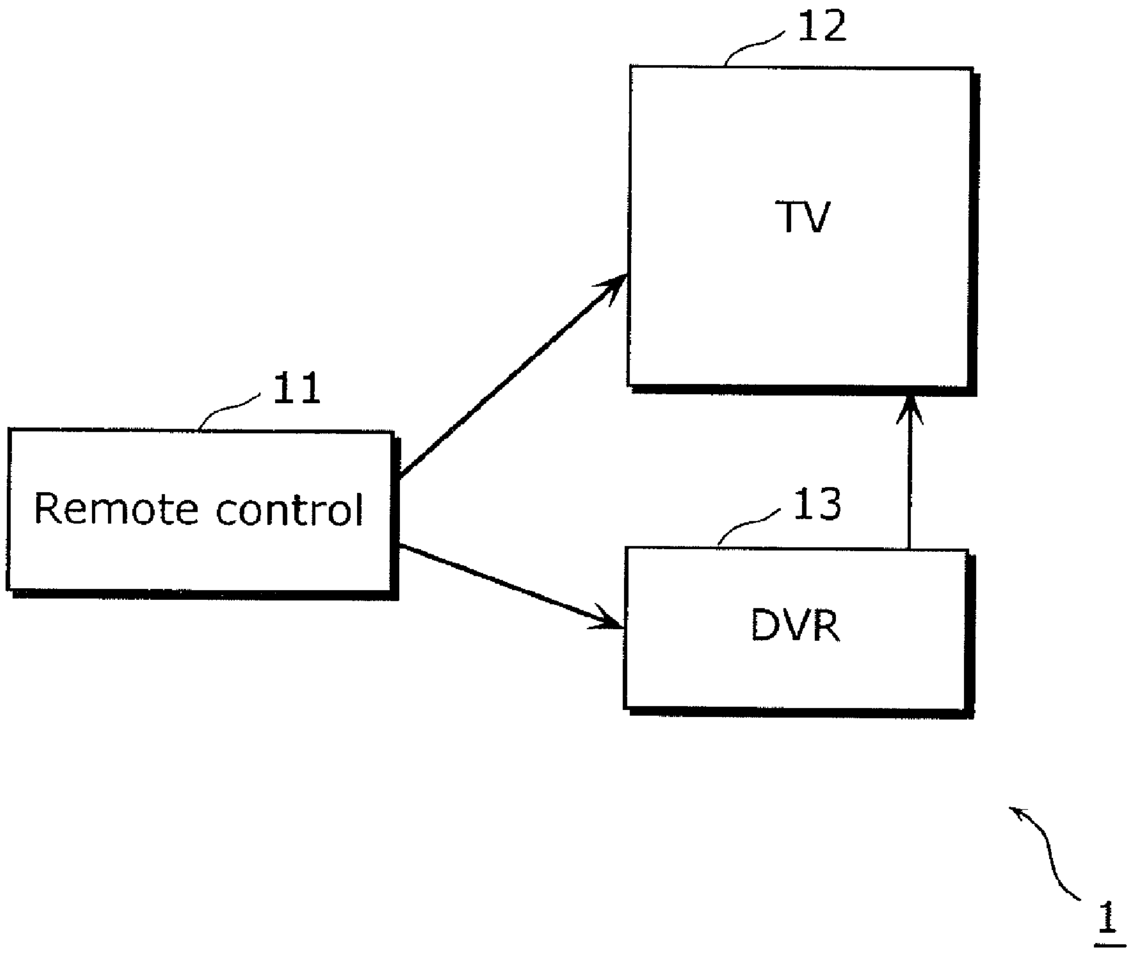
FIG. 1 is a block diagram showing a structure of a wireless controlling apparatus in an embodiment A of the present invention.

| | |
|---|---|
| 1 | Remote control system |
| 2 | Wireless remote control system |
| 11 | Remote control |
| 12 | TV |

-continued

| | |
|---|---|
| 13 | DVR |
| 110, 122, 142 | Push button |
| 111, 126, 147 | Pairing information register |
| 112, 125, 145 | Wireless transmission unit |
| 113, 124, 144 | Address register |
| 114, 123, 143 | Wireless reception unit |
| 115, 127, 146 | Control circuit |
| 116 | Key group |
| 117 | Destination register |
| 128, 148 | Output register |
| 129 | Connected apparatus information register |
| 130, 150 | Menu generation unit |
| 131, 151 | Tuner |
| 132 | HDMI input unit |
| 133 | Display |
| 134 | Selection circuit |
| 149 | Display register |
| 152 | HDD drive |
| 153 | HDMI output unit |
| 154 | Decoder |
| 155 | Switch |
| 156 | Recording schedule list |
| 157 | Content list |
| 2103 | First communication medium |
| 2104 | Second communication medium |
| 2200 | Remote control apparatus |
| 2201 | Operation information generation unit |
| 2202 | Identifier holding unit |
| 2203 | First transmission unit |
| 2204 | Second transmission unit |
| 2400 | Reception apparatus in embodiment B1 |
| 2401 | First reception unit |
| 2402 | Second reception unit |
| 2403 | Identifier determination unit |
| 2404 | Operation information execution unit |
| 2601 | Identifier determination unit in embodiment B2 |
| 2602 | Determination unit |
| 2603 | Storage buffer unit |

BEST MODE FOR CARRYING OUT THE INVENTION

The following describes embodiments of the present invention with reference to drawings.

An embodiment A and an embodiment B described below are common in the following point. The embodiment A and the embodiment B are each a wireless control system (a remote control system 1, a wireless remote control system 2) including a controlled apparatus (a TV 12, a DVR 13, a reception apparatus 2400) and a wireless controlling apparatus (a remote control 11, a remote control apparatus 2200) that controls the controlled apparatus via a wireless communication path. In the wireless control system, one (the remote control 11, the reception apparatus 2400) of the controlled apparatus and the wireless controlling apparatus includes an obtainment unit (a wireless reception unit 114, a first reception unit 2401) and a setting unit (a control circuit 115, an identifier determination unit 2403). The obtainment unit obtains recognition information (pairing information, an identifier) used by the apparatus to uniquely recognize the other apparatus (the DVR 13, the remote control apparatus 2200), via another communication path (a communication path between the DVR 13 and the remote control 11 through the TV 12, a communication path of a first communication medium 2103) different from the wireless communication path connecting the apparatus and the other apparatus. The setting unit, when a connected apparatus recognized via the wireless communication path is identified by the obtained recognition information, sets the connected apparatus as the other apparatus to enable communication with the connected apparatus. The embodiment A and the embodiment B provide common advantages by this common structure.

Embodiment A

The embodiment A relates to a wireless controlling apparatus, and particularly relates to a technical field of a wireless controlling apparatus that controls a controlled apparatus through wireless communication.

The wireless controlling apparatus in the embodiment A is a wireless controlling apparatus including a plurality of controlled apparatuses and a controller that controls the plurality of controlled apparatuses through wireless communication. In the wireless controlling apparatus, a first controlled apparatus of the plurality of controlled apparatuses has first recognition information which is recognition information used by the controller to uniquely recognize the first controlled apparatus. A second controlled apparatus of the plurality of controlled apparatuses that is different from the first controlled apparatus has second recognition information which is recognition information used by the controller to uniquely recognize the second controlled apparatus. In the case where the controller recognizes the first controlled apparatus according to the first recognition information, when the first controlled apparatus and the second controlled apparatus are connected to each other, the second controlled apparatus outputs the second recognition information to the first controlled apparatus. The first controlled apparatus outputs the second recognition information to the controller. The controller recognizes the first controlled apparatus and the second controlled apparatus.

In this way, the controller and the second controlled apparatus can be paired automatically. Hence, it is possible to provide a wireless controlling apparatus in which pairing can be automatically performed between a controlling apparatus and a plurality of controlled apparatuses and the plurality of controlled apparatuses paired with the controlling apparatus can be switched appropriately.

In the embodiment A of the present invention, a wireless controlling apparatus includes a plurality of controlled apparatuses and a controller that controls the plurality of controlled apparatuses through wireless communication. In the wireless controlling apparatus, a first controlled apparatus of the plurality of controlled apparatuses has first recognition information which is recognition information used by the controller to uniquely recognize the first controlled apparatus. A second controlled apparatus of the plurality of controlled apparatuses that is different from the first controlled apparatus has second recognition information which is recognition information used by the controller to uniquely recognize the second controlled apparatus. In the case where the controller recognizes the first controlled apparatus according to the first recognition information, when the first controlled apparatus and the second controlled apparatus are connected to each other, the second controlled apparatus outputs the second recognition information to the first controlled apparatus. The first controlled apparatus outputs the second recognition information to the controller. The controller recognizes the first controlled apparatus and the second controlled apparatus.

According to this, the controller and the second controlled apparatus can be paired automatically.

Moreover, when the first controlled apparatus and the second controlled apparatus are connected to each other, the second controlled apparatus outputs the second recognition information to the first controlled apparatus, and the first controlled apparatus stores the second recognition information. When the controller and the first controlled apparatus communicate the first recognition information through wireless communication, the first controlled apparatus outputs the first wireless control information and the second wireless control information to the controller.

According to this, pairing can be appropriately performed between the controller and each of the first and second controlled apparatuses.

Moreover, the recognition information is information that includes at least addresses and encryption keys of the plurality of controlled apparatuses.

According to this, the pairing can be performed automatically and appropriately by using the addresses and the encryption keys.

Moreover, the first controlled apparatus includes a display unit. The first controlled apparatus is a controlled apparatus that selectively displays first visual information and second visual information. The first visual information includes at least a moving image and a still image generated in the first controlled apparatus, and the second visual information includes at least a moving image and a still image generated in the second controlled apparatus. The controller communicates with the first controlled apparatus when the first visual information is displayed on the display unit, and communicates with the second controlled apparatus when the second visual information is displayed on the display unit.

According to this, the plurality of controlled apparatuses paired with the controller can be switched appropriately.

Moreover, when communicating with the controller while the second visual information is displayed, the first controlled apparatus outputs the second recognition information to the controller.

According to this, the controller can control the second controlled apparatus appropriately.

Moreover, the second controlled apparatus determines visual information displayed on the display unit. When determining that the visual information displayed on the display unit is the first visual information, the second controlled apparatus rejects communication information outputted from the controller.

According to this, wrong control on the second controlled apparatus can be prevented.

Moreover, a pairing method of a wireless controlling apparatus including a plurality of controlled apparatuses and a controller that controls the plurality of controlled apparatuses through wireless communication is the following. In the pairing method, a first controlled apparatus of the plurality of controlled apparatuses has first recognition information which is recognition information used by the controller to uniquely recognize the first controlled apparatus. A second controlled apparatus of the plurality of controlled apparatuses that is different from the first controlled apparatus has second recognition information which is recognition information used by the controller to uniquely recognize the second controlled apparatus. In the case where the controller recognizes the first controlled apparatus according to the first recognition information, when the first controlled apparatus and the second controlled apparatus are connected to each other, the second controlled apparatus outputs the second recognition information to the first controlled apparatus. The first controlled apparatus outputs the second recognition information to the controller. The controller recognizes the first controlled apparatus and the second controlled apparatus.

According to this, the controller and the second controlled apparatus can be paired automatically, and the plurality of controlled apparatuses paired with the controller can be switched appropriately.

FIG. 1 is a block diagram of the remote control system 1 according to the present invention.

The remote control system 1 includes components denoted by numerals 11, 12, and 13. Here, numeral 11 denotes a remote control. Numeral 12 denotes a TV. Numeral 13 denotes a Digital Video Recorder (DVR).

The remote control 11 is provided with keys. An operation command corresponding to each key is transmitted from the remote control 11 to the TV 12 or the DVR 13 via radio waves as a communication medium, when the key is pressed.

The TV 12 includes a display as a display unit, and displays an image received by a tuner included in the TV 12 and also displays at least one of a moving image and a still image outputted from the DVR 13. The TV 12 also has a GUI, and the remote control 11 is used to control the TV 12.

Likewise, the DVR 13 has a GUI. The user controls the DVR 13 by operating the GUI using the remote control 11.

Note that, in this embodiment, HDMI is used for communication between the TV 12 and the DVR 13. However, the communication between the TV 12 and the DVR 13 is not limited to HDMI, and any interface capable of communicating a control signal bidirectionally, such as Wireless HDMI, is applicable. Moreover, the radio waves may be any typically used omnidirectional signal propagation means. Examples of such omnidirectional signal propagation means include radio waves based on a communication standard established in IEEE 802.11, and Bluetooth based on a communication standard established in IEEE 802.15.1.

Figure 2:
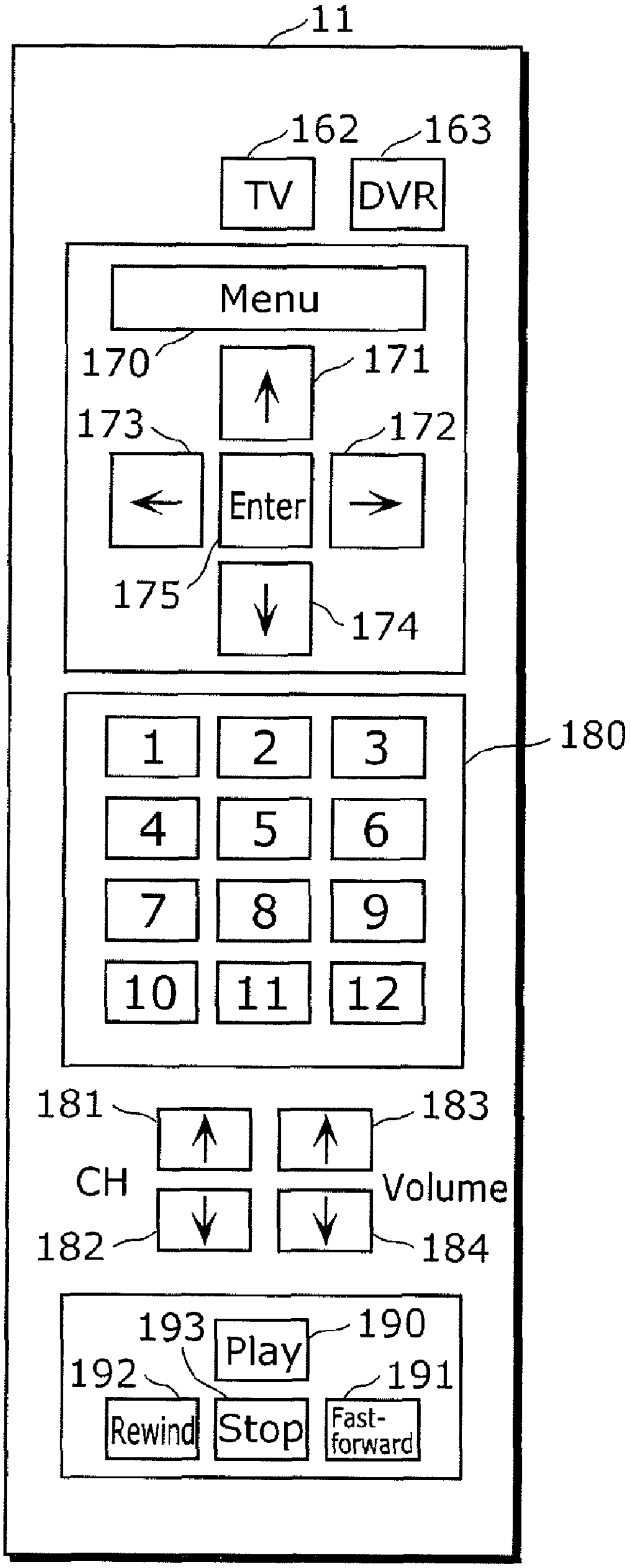
FIG. 2 is a view showing a key layout of a remote control in the embodiment A of the present invention.

FIG. 2 is a view showing an example of a key group 116 included in the remote control 11.

In more detail, the remote control 11 includes components denoted by numerals 162, 163, 170, 171, 172, 173, 174, 175, 180, 181, 182, 183, 184, 190, 191, 192, and 193.

Numeral 162 denotes a TV switch key. Numeral 163 denotes a DVR switch key. Numeral 170 denotes a menu key. Numeral 171 denotes an arrow key (up). Numeral 172 denotes an arrow key (right). Numeral 173 denotes an arrow key (left). Numeral 174 denotes an arrow key (down). Numeral 175 denotes an enter key. Numeral 180 denotes a numeric keypad. Numeral 181 denotes a channel up key. Numeral 182 denotes a channel down key. Numeral 183 denotes a volume up key. Numeral 184 denotes a volume down key. Numeral 190 denotes a play key. Numeral 191 denotes a fast forward key. Numeral 192 denotes a rewind key. Numeral 193 denotes a stop key.

The remote control 11 includes arrow keys, channel keys, and DVR operation keys.

The arrow key (up) 171, the arrow key (right) 172, the arrow key (left) 173, and the arrow key (down) 174 are collectively referred to as arrow keys. The numeric keypad 180, the channel up key 181, and the channel down key 182 are collectively referred to as channel keys. The volume up key 183 and the volume down key 184 are collectively referred to as volume keys. The play key 190, the fast forward key 191, the rewind key 192, and the stop key 193 are collectively referred to as DVR operation keys.

A table 1 below shows each key, from among the keys on the remote control 11, whose key information is transmitted from the remote control 11 to the TV 12 when the key is pressed.

TABLE 1

| |
|---|
| TV switch 162 |
| DVR switch key 163 |
| Numeric keypad 180 |
| Channel key |
| Volume key |

A table 2 below shows each key, from among the keys on the remote control 11, whose key information is transmitted from the remote control 11 to the DVR 13 when the key is pressed.

TABLE 2

| |
|---|
| Play key 190 |
| Fast forward key 191 |
| Rewind key 192 |
| Stop key 193 |

A table 3 below shows each key, from among the keys on the remote control 11, whose key information is transmitted to either the TV 12 or the DVR 13 depending on an internal state of the remote control 11 when the key is pressed.

TABLE 3

| |
|---|
| Menu key 170 |
| Arrow key |
| Enter key 175 |

The following describes operations of the remote control 11, the TV 12, and the DVR 13 when information of each key transmitted from the remote control 11 is received by the TV 12 and the DVR 13.

Program information multiplexed in a broadcast wave transmitted from a broadcast station to the TV 12 is assigned to any of the numbers called channels from 1 to 12.

The numeric keypad 180 is composed of a group of keys to which the channels from 1 to 12 are assigned. When the numeric keypad 180 is pressed, the TV 12 decodes a broadcast wave transmitted from a broadcast station by an internal tuner, and displays a moving image or a still image obtained as a result of the decoding on the display. Here, a broadcast wave of a channel corresponding to a pressed key on the numeric keypad 180 is selected.

When the channel up key 181 is pressed, the TV 12 selects a broadcast wave of a channel that adds 1 to a channel selected before the channel up key 181 is pressed. The TV 12 then decodes the broadcast wave by the internal tuner, and displays a moving image or a still image obtained as a result of the decoding on the display. In the case where the channel selected before the channel up key 181 is pressed is 12, the channel 1 is selected.

When the channel down key 182 is pressed, the TV 12 selects a broadcast wave of a channel that subtracts 1 from a channel selected before the channel down key 182 is pressed. The TV 12 then decodes the broadcast wave by the internal tuner, and displays a moving image or a still image obtained as a result of the decoding on the display. In the case where the channel selected before the channel down key 182 is pressed is 1, the channel 12 is selected.

When the volume up key 183 is pressed, the TV 12 increases the volume. When the volume down key 184 is pressed, the TV 12 decreases the volume.

When the play key 190 is pressed, the DVR 13 reproduces a content at a normal speed. When the rewind key 192 is pressed, the DVR 13 reproduces the content backward. When the fast forward key 191 is pressed, the DVR 13 reproduces the content fast forward. When the stop key 193 is pressed, the DVR 13 stops the content. The apparatus operation keys are valid only when the DVR 13 is in a content reproduction state.

When the menu key 170 is pressed, a menu set in the TV 12 or the DVR 13 is displayed. Several buttons and one highlighted button are displayed on the menu.

By pressing an arrow key, the highlighted button is moved.

A function is assigned to each of these buttons. By pressing the enter key 175, the function, namely, the function of the highlighted button, is executed.

Figure 3:
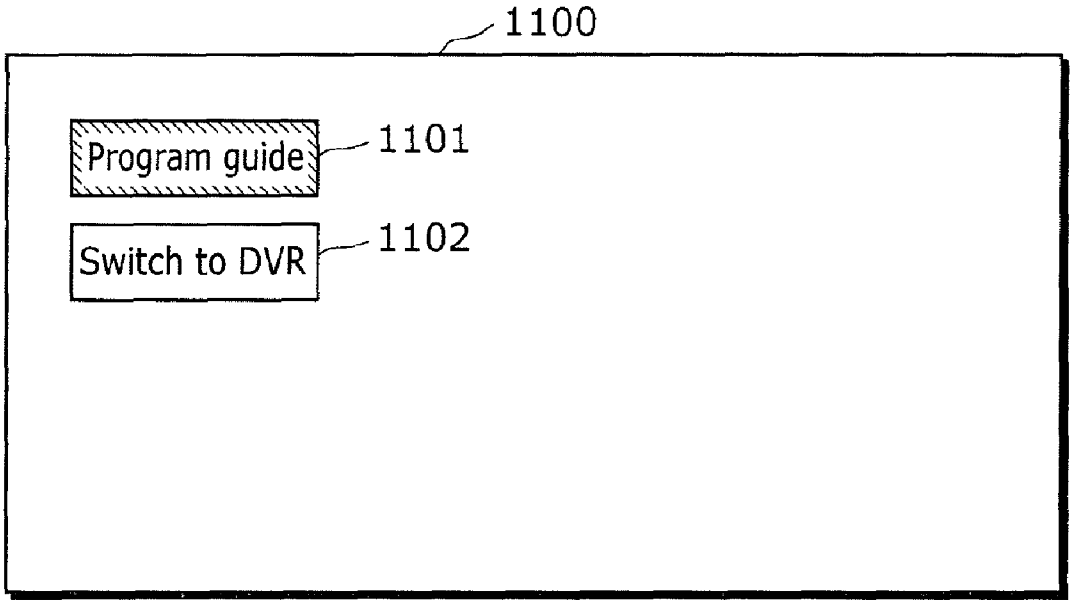
FIG. 3 is a view showing a menu layout of a TV in the embodiment A of the present invention.

FIG. 3 is a view showing a menu 1100 of the TV 12 in the embodiment of the present invention.

Numeral 1100 denotes a menu. Numeral 1101 denotes a program guide button. Numeral 1102 denotes a DVR switch button. When the menu 1100 is displayed, one of the program guide button 1101 and the DVR switch button 1102 is highlighted. When the program guide button 1101 is pressed, that is, when the enter key 175 is pressed while the program guide button 1101 is highlighted, a program guide menu 1110 is displayed. When the DVR switch button 1102 is pressed, the TV 12 displays a HDMI input image on the display.

Figure 4:
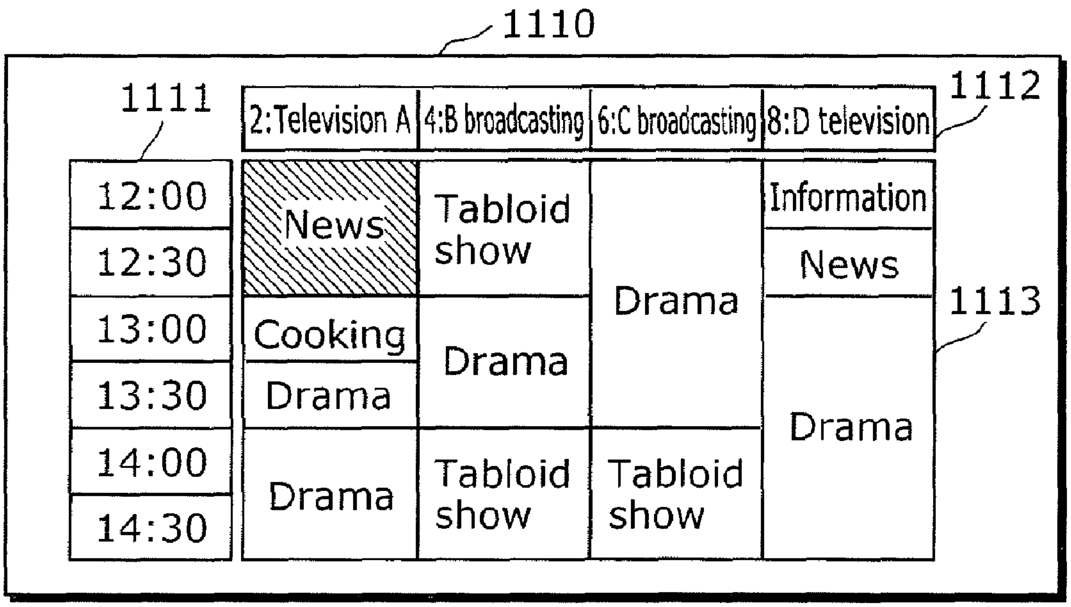
FIG. 4 is a view showing a menu layout of a program guide in the embodiment A of the present invention.

FIG. 4 is a view showing the program guide menu 1110 of the TV 12.

Numeral 1110 denotes a program guide. Numeral 1111 denotes a time display. Numeral 1112 denotes a broadcast station display. Numeral 1113 denotes a program display. When displaying the program guide 1110, the TV 12 displays programs of each broadcast station which are scheduled to be broadcast in immediately following hours, in the program display 1113. Here, the TV 12 displays the programs of each broadcast station in a column in order of time. The TV 12 also displays the broadcast station display 1112 in an upper part of the program guide 1110 and the time display 1111 in a left part of the program guide 1110, for the user's convenience. A program displayed before the program guide 1110 is displayed is highlighted. When an arrow key is pressed, the highlight is moved up, down, left, or right. When the enter key 75 is pressed, the highlighted broadcast station is selected.

Figure 5:
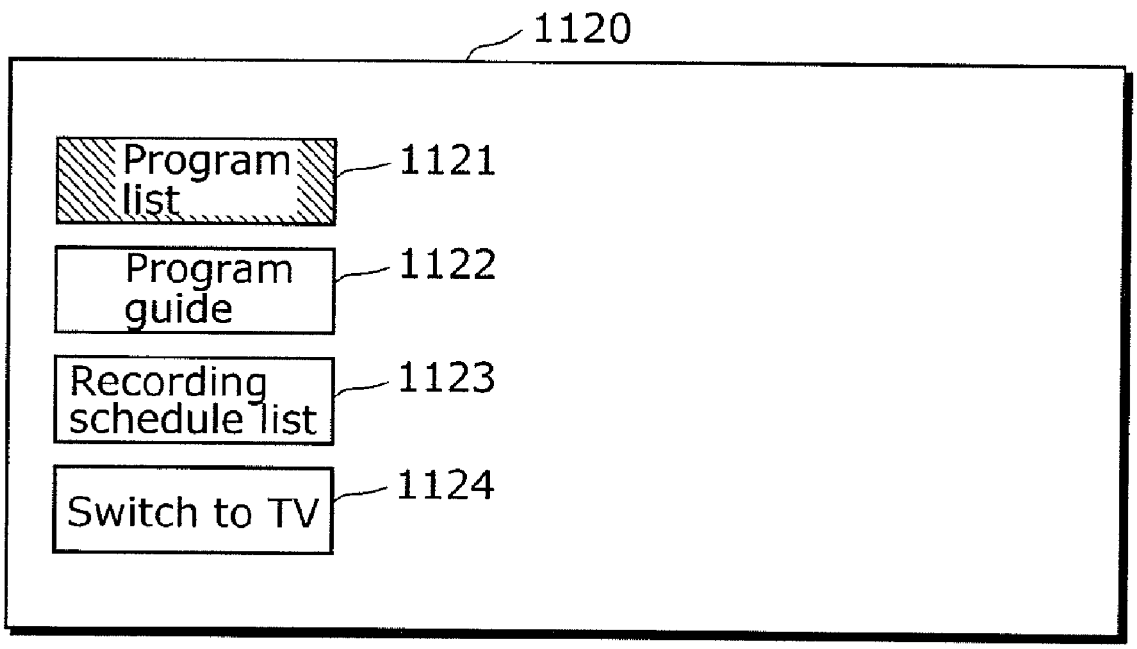
FIG. 5 is a view showing a menu layout of a DVR in the embodiment A of the present invention.

FIG. 5 is a view showing a menu 1120 of the DVR 13.

The DVR 13 has the TV 12 display the menu 1120.

Numeral 1120 denotes a menu. Numeral 1121 denotes a content list button. Numeral 1122 denotes a program guide button. Numeral 1123 denotes a recording schedule list button. Numeral 1124 denotes a TV switch button.

When the content list button 1121 is executed, a content list menu is displayed. When the program guide button 1122 is executed, a program guide menu is displayed. When the recording schedule list button 1123 is executed, a recording schedule list menu is displayed. When the TV switch button 1124 is pressed, the DVR 13 issues a command to return the display by the TV 12 to a tuner image, to the TV 12. When this command is issued, the TV 12 displays the tuner image on the display. In the content list menu, a list of contents recorded in the DVR 13 is displayed. In the program guide menu, a list of programs broadcast by each broadcast station is displayed. In the recording schedule list menu, a list of programs scheduled to be recorded is displayed.

FIG. 6 is a view showing a content list menu 1130.

Numeral 1130 denotes a content list menu. Numeral 1131 denotes a content display. The DVR 13 displays information of each recorded content, as the content display 1131. Displayed items include a title, a recording date, and a length (duration) of each content. When the content list menu 1130 is displayed, one of the contents in the content list 1131 is highlighted. When an arrow key is pressed, the highlight is moved. When the enter key 175 is pressed, the highlighted content in the content display 1131 is reproduced.

The program guide menu in the DVR 13 is the same as the program guide menu 1110 (FIG. 4) in the TV 12. Note however that, when the enter key 175 is pressed, the broadcast station of the highlighted program is selected in the case of the program guide menu in the TV 12, whereas the highlighted program is scheduled to be recorded in the case of the program guide menu in the DVR 13.

FIG. 7 is a view showing a recording schedule list menu 1140.

Numeral 1140 denotes a recording schedule list menu. Numeral 1141 denotes a recording schedule display. The DVR 13 displays each program scheduled to be recorded, as the recording schedule display 1141. Displayed items include a broadcast station, a start date and time, and a title of each program. When the recording schedule list menu 1140 is displayed, one of the recording schedules in the recording schedule list 1141 is highlighted. When an arrow key is pressed, the highlight is moved. When the enter key 175 is pressed, the highlighted recording schedule in the recording schedule display 1141 is canceled.

There are three types of screens displayed by the TV 12: a menu screen, a tuner image, and a HDMI input image.

Figure 8:
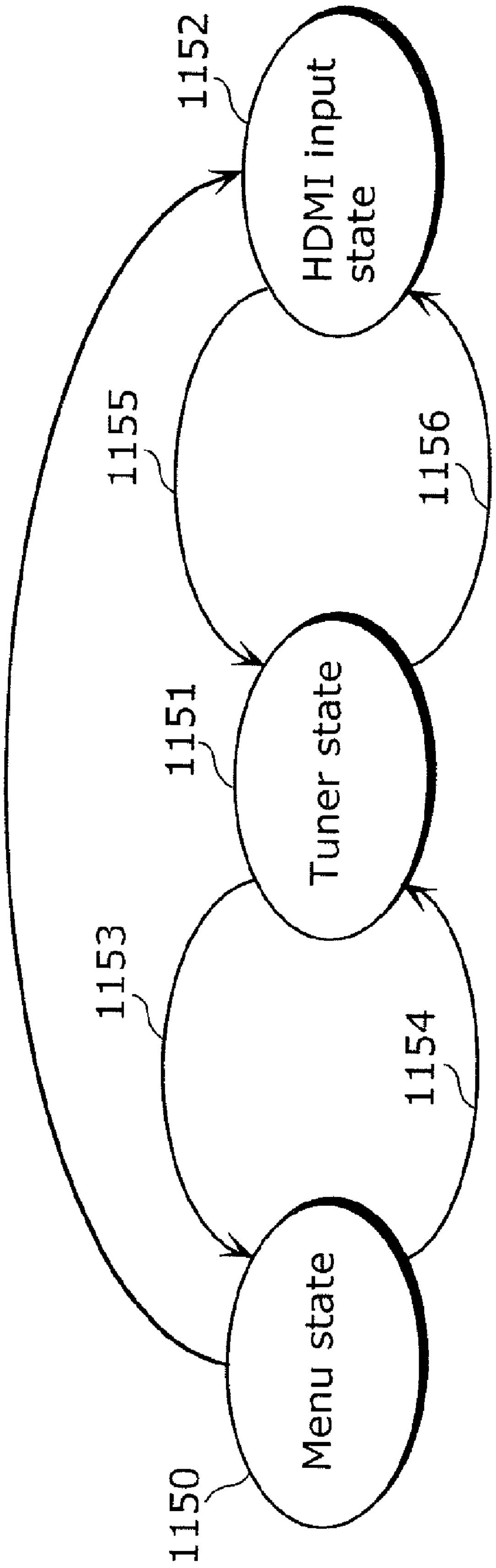
FIG. 8 is a diagram showing display state transitions of the TV in the embodiment A of the present invention.

FIG. 8 is a diagram showing display state transitions of the TV in the embodiment of the present invention.

Numeral 1150 denotes a menu state in which a menu screen is displayed. Numeral 1151 denotes a tuner state in which a tuner image is displayed. Numeral 1152 denotes a HDMI input state in which a HDMI input image is displayed. Numeral 1153 denotes a path of transitioning from the tuner state 1151 to the menu state 1150. Numeral 1154 denotes a path of transitioning from the menu state 1150 to the tuner state 1151. Numeral 1155 denotes a path of transitioning from the HDMI input state 1152 to the tuner state 1151. Numeral 1156 denotes a path of transitioning from the tuner state 1151 to the HDMI input state 1152. The TV 12 displays a menu screen (the menu 1100 in FIG. 3, the menu 1110 in FIG. 4) in the menu state 1150. The TV 12 displays a tuner image in the tuner state 1151. The TV 12 displays a HDMI input image (the menu 1120 in FIG. 5, the menu 1130 in FIG. 6, the menu 1140 in FIG. 7) in the HDMI input state 1152.

An initial state of the TV 12 is the tuner state 1151. Conditions for the transitions of the paths 1153, 1154, 1155, and 1156 are shown in a table 4.

TABLE 4

| | |
|---|---|
| Path 1153 | The menu key 175 is pressed.<br>"Switch to DVR" is executed in the menu of the TV 12. |
| Path 1154 | The menu key 175 is pressed. |
| Path 1155 | The TV switch key 162 is pressed. A channel key is pressed.<br>"Switch to TV" is executed in the menu of the DVR 13. As a result, the DVR 13 issues a command to return the display to a tuner image, to the TV 12. |
| Path 1156 | The DVR switch key 163 is pressed. |

When the transition of the path 1155 occurs, the TV 12 notifies the DVR 13 that the TV 12 displays a TV tuner image. When the transition of the path 1156 occurs, the TV 12 notifies the DVR 13 that the TV 12 displays an image of the DVR 13, namely, an image outputted from the DVR 13 to the TV 12.

In the HDMI input state 1152, when the TV 12 receives a command of any of the menu key 170, the arrow keys, and the enter key 175 from the remote control 11, the TV 12 rejects the received command. The TV 12 then notifies the remote control 11 of an address of the DVR 13 as a destination address to which the remote control 11 is to transmit the command.

There are two types of screens displayed by the DVR 13: a menu screen and a content image.

Figure 9:
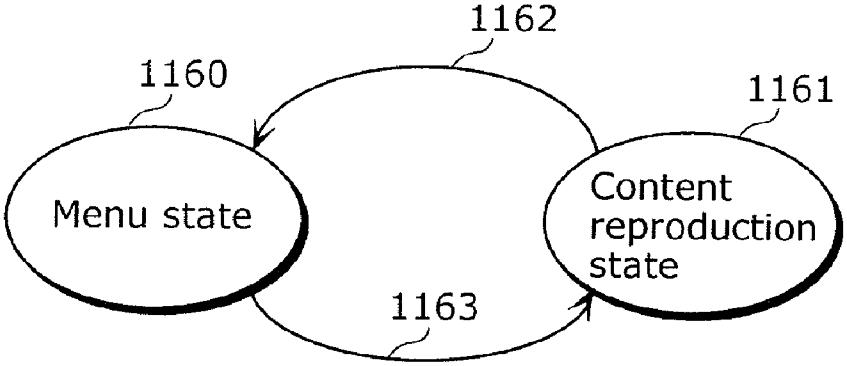
FIG. 9 is a diagram showing display state transitions of the DVR in the embodiment A of the present invention.

FIG. 9 is a diagram showing display state transitions of the DVR 13.

Numeral 1160 denotes a menu display state in which a menu is displayed. Numeral 1161 denotes a content reproduction state in which a content is displayed. Numeral 1162 denotes a path of transitioning from the content reproduction state 1161 to the menu state 1160. Numeral 1163 denotes a path of transitioning from the menu state 1161 to the content reproduction state 1161. The DVR 13 displays a menu in the menu display state 1160, and displays a content in the content reproduction state 1161.

When the state of the TV 12 transitions to the HDMI input state 1152, the state of the DVR 13 is set to the menu state 1160. Conditions for the transitions of the paths 1162 and 1163 are shown in a table 5.

TABLE 5

| | |
|---|---|
| Path 1162 | The menu key 175 is pressed. |
| Path 1163 | The enter key 175 is pressed in the content list menu 1130. |

The DVR 13 holds a state for managing whether or not the TV 12 displays a HDMI input image.

Figure 10:
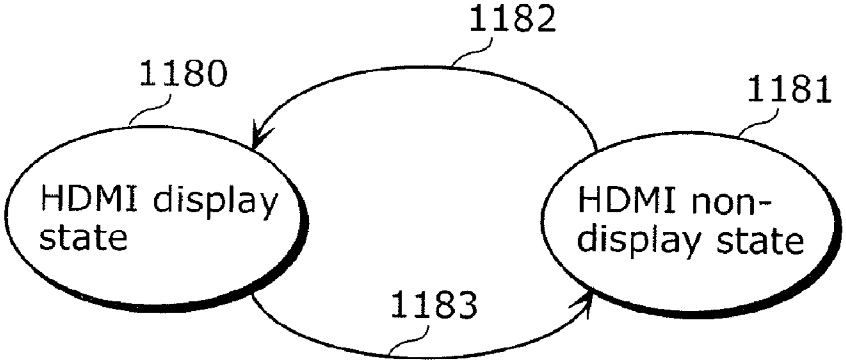
FIG. 10 is a diagram showing display state transitions of HDMI in the embodiment A of the present invention.

FIG. 10 is a view showing state transitions of HDMI input display management.

Numeral 1180 denotes a HDMI display state. Numeral 1181 denotes a HDMI non-display state. Numeral 1182 denotes a path of transitioning from the HDMI non-display state 1181 to the HDMI display state 1180. Numeral 1183 denotes a path of transitioning from the HDMI display state 1180 to the HDMI non-display state 1181.

In the HDMI non-display state 1181, when the DVR 13 receives a command from the remote control 11, the DVR 13 rejects the command. Conditions for the transitions of the paths 1182 and 1183 are shown in a table 6.

TABLE 6

| | |
|---|---|
| Path 1182 | The TV 12 notifies to display an image of the DVR 13. |
| Path 1183 | The TV 12 notifies to display a tuner image or the like other than an image of the DVR 13. |

In more detail, for example, the DVR 13 holds HDMI display/non-display information showing whether the DVR 13 is in the HDMI display state 1180 or the HDMI non-display state 1181. The HDMI display/non-display information is information showing whether or not the TV 12 displays a HDMI input image.

The remote control 11 holds a state for managing a destination of the menu key 170, the arrow keys (the arrow key (up) 171 and so on), and the enter key 175.

Figure 11:
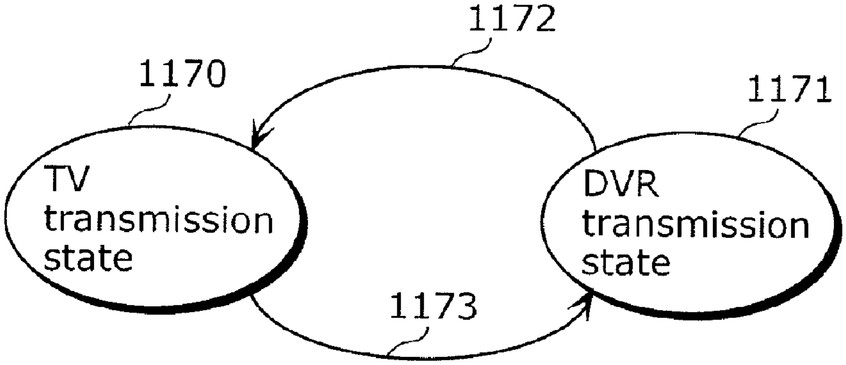
FIG. 11 is a diagram showing destination state transitions of the remote control in the embodiment A of the present invention.

FIG. 11 is a diagram showing state transitions of destination management. Numeral 1170 denotes a TV transmission state. Numeral 1171 denotes a DVR transmission state. Numeral 1172 denotes a path of transitioning from the DVR transmission state 1171 to the TV transmission state 1170. Numeral 1173 denotes a path of transitioning from the TV transmission state 1170 to the DVR transmission state 1171.

In the TV transmission state 1170, when any of the menu key 170, the arrow keys, and the enter key 175 is pressed, the remote control 11 transmits information of the pressed key to the TV 12. In the DVR transmission state 1171, when any of the menu key 170, the arrow keys, and the enter key 175 is pressed, the remote control 11 transmits information of the pressed key to the DVR 13.

Conditions for the transitions of the paths 1172 and 1173 are shown in a table 7.

TABLE 7

| | |
|---|---|
| Path 1172 | The TV switch key 162 is pressed.<br>A channel key is pressed.<br>A command transmitted to the DVR 13 is rejected. |
| Path 1173 | The DVR switch key 163 is pressed.<br>A command transmitted to the TV 12 is rejected, and the DVR 13 is designated as a destination address. |

Figure 12:
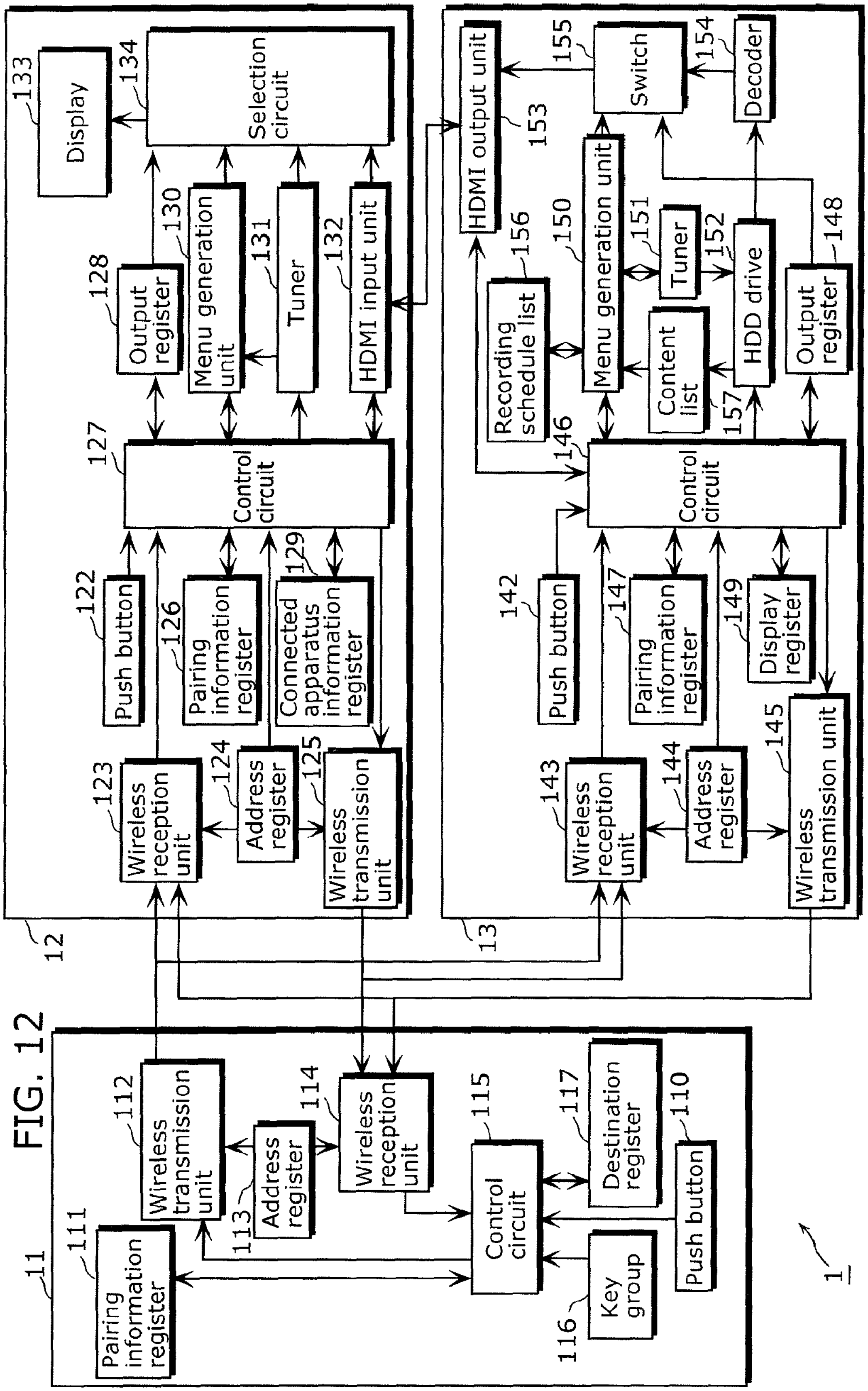
FIG. 12 is a block diagram showing a detailed structure of the wireless controlling apparatus in the embodiment A of the present invention.

The following describes pairing between the remote control 11 and the TV 12. The remote control 11 and the TV 12 are each provided with a pairing push button. The case where the user presses each of these push buttons is described below. Note that a pairing push button 110 of the remote control 11 and a pairing push button 122 of the TV 12 are shown in FIG. 12 described in detail later.

When the pairing push button 122 (see FIG. 12) is pressed, the TV 12 starts a wireless communication reception wait state and, upon receiving a pairing request packet, returns a pairing acknowledgement packet. That is, when the pairing push button 122 (see FIG. 12) is pressed, the TV 12 enters the wireless communication reception wait state. Having entered the wireless communication reception wait state, the TV 12 returns the pairing acknowledgement packet to the remote control 11 upon receiving the pairing request packet from the remote control 11. The pairing acknowledgement packet includes not only an address, a category, and an encryption key of the TV 12 but also information of an apparatus (for example, the DVR 13) connected to the TV 12. A table 8 shows apparatus information.

TABLE 8

| |
|---|
| Category of apparatus |
| Address of apparatus |
| Encryption key of apparatus |

Here, the category is a code indicating a type of apparatus such as a TV or a DVR. The encryption key is a key used to encrypt communication when transmitting a command to the apparatus. At least the pairing request packet and the pairing acknowledgement packet are communicated in plaintext. The address is an address when performing wireless communication.

When the pairing push button 110 of the remote control 11 is pressed, the remote control 11 transmits the pairing request packet by broadcasting. Broadcasting is a transmission method that does not designate a destination. In the case of non-broadcast transmission of a packet, even when a reception apparatus is within reach of radio waves of wireless communication of the packet, the packet is not received by the reception apparatus unless a destination designated by the packet is the reception apparatus. In the case of broadcast transmission of a packet, on the other hand, the packet is received even by a reception apparatus that does not receive the packet in the case of non-broadcast transmission. After transmitting the pairing request packet, the remote control 11 waits for receiving a response from a reception apparatus that has received the pairing request packet, for a predetermined time. When the remote control 11 receives the pairing acknowledgement packet during this time, the remote control 11 stores information of the reception apparatus that returns the received pairing acknowledgement packet. Note that, in the case where the pairing acknowledgement packet includes information of a plurality of apparatuses, the remote control 11 stores the information of the plurality of apparatuses.

When the DVR 13 is connected to the TV 12, that is, upon connection to the TV 12, the DVR 13 transmits apparatus information of the DVR 13 including a category, an address, and an encryption key to the TV 12. The TV 12 stores this information transmitted from the DVR 13. At the time of pairing between the TV 12 and the remote control 11, the TV 12 transmits this stored information to the remote control 11.

The TV 12 and the DVR 13 each have a conventional infrared remote control command reception unit, and execute a command obtained by the command reception unit.

FIG. 12 is a block diagram showing a detailed structure of the remote control system 1 according to the present invention.

Numeral 110 denotes a push button (pairing push button). Numeral 111 denotes a pairing information register. Numeral 112 denotes a wireless transmission unit. Numeral 113 denotes an address register. Numeral 114 denotes a wireless reception unit. Numeral 115 denotes a control circuit. Numeral 116 denotes a key group. Numeral 117 denotes a destination register. Numeral 122 denotes a push button (pairing push button). Numeral 123 denotes a wireless reception unit. Numeral 124 denotes an address register. Numeral 125 denotes a wireless transmission unit. Numeral 126 denotes a pairing information register. Numeral 127 denotes a control circuit. Numeral 128 denotes an output register. Numeral 129 denotes a connected apparatus information register. Numeral 130 denotes a menu generation unit. Numeral 131 denotes a tuner. Numeral 132 denotes a HDMI input unit. Numeral 133 denotes a display. Numeral 134 denotes a selection circuit. Numeral 142 denotes a push button. Numeral 143 denotes a wireless reception unit. Numeral 144 denotes an address register. Numeral 145 denotes a wireless transmission unit. Numeral 146 denotes a control circuit. Numeral 147 denotes a pairing information register. Numeral 148 denotes an output register. Numeral 149 denotes a display register. Numeral 150 denotes a menu generation unit. Numeral 151 denotes a tuner. Numeral 152 denotes a HDD drive. Numeral 153 denotes a HDMI output unit. Numeral 154 denotes a decoder. Numeral 155 denotes a switch.

The address of the remote control 11 is written in the address register 113 in the remote control 11 in advance, at the time of factory shipment. The address of the TV 12 is written in the address register 124 in the TV 12 in advance, at the time of factory shipment. The address of the DVR 13 is written in the address register 144 in the DVR 13 in advance, at the time of factory shipment. Each address written at the time of factory shipment is unique identification data among all of these apparatuses including the remote control 11 and the like.

The wireless reception unit 114 in the remote control 11 abandons a received packet, when a destination of the received packet is not an address of the wireless reception unit 114 (the address of the remote control 11) and also the packet is not a broadcast packet. Note that the wireless reception unit 114 obtains the address of the remote control 11 from the address register 113 in the remote control 11, and sets the obtained address as the address of the wireless reception unit 114.

The wireless reception unit 123 in the TV 12 abandons a received packet, when a destination of the received packet is not an address of the wireless reception unit 123 (the address of the TV 12) and also the packet is not a broadcast packet. Note that the wireless reception unit 123 obtains the address of the TV 12 from the address register 124 in the TV 12, and sets the obtained address as the address of the wireless reception unit 123.

The wireless reception unit 143 in the DVR 13 abandons a received packet, when a destination of the received packet is not an address of the wireless reception unit 143 and also the packet is not a broadcast packet. Note that the wireless reception unit 143 obtains the address of the DVR 13 from the address register 144 in the DVR 13, and sets the obtained address as the address of the wireless reception unit 143.

The wireless transmission unit 112 in the remote control 11, when transmitting a packet, reads the address of the remote control 11 from the address register 113 in the remote control 11, and transmits the packet with the read address as a source address.

Likewise, the wireless transmission unit 125 in the TV 12, when transmitting a packet, reads the address of the TV 12 from the address register 124 in the TV 12, and transmits the packet with the read address as a source address.

Likewise, the wireless transmission unit 145 in the DVR 13, when transmitting a packet, reads the address from the address register 144 in the DVR 13, and transmits the packet with the read address as a source address.

Here, a packet includes a source address, a destination address, a packet type, and a payload. The destination address either designates an address of a destination apparatus, or designates broadcasting. The packet type includes three types that are a pairing request, a pairing acknowledgement, and a command.

The packet transmitted from the wireless transmission unit 112 in the remote control 11 reaches the wireless reception unit 123 and the wireless reception unit 143 through air. Likewise, the packet transmitted from the wireless transmission unit 125 in the TV 12 reaches the wireless reception unit 114 and the wireless reception unit 143 through air. Likewise, the packet transmitted from the wireless transmission unit 145 in the DVR 13 reaches the wireless reception unit 114 and the wireless reception unit 123 through air.

The following describes HDMI.

The DVR 13 outputs an image from the HDMI output unit 153 to the TV 12. The TV 12 outputs the image of HDMI inputted from the HDMI input unit 132, to the selection circuit 134. HDMI has a data communication feature called CEC.

First, when transmitting data from the TV 12 to the DVR 13, the control circuit 127 outputs the data to be transmitted to the DVR 13, to the HDMI input unit 132. The HDMI input unit 132 converts the data to be transmitted, to CEC data, and outputs the converted CEC data to the HDMI output unit 153. The HDMI output unit 153 receives the CEC data outputted from the HDMI input unit 132, decodes the received CEC data, and outputs the decoded data to the control circuit 146.

Likewise, when transmitting data from the DVR 13 to the TV 12, the control circuit 146 outputs the data to be transmitted to the TV 12, to the HDMI output unit 153. The HDMI output unit 153 converts the data to be transmitted, to CEC data, and outputs the CEC data to the HDMI input unit 132. The HDMI input unit 132 receives the outputted CEC data, decodes the received CEC data, and outputs the decoded data to the control circuit 127.

The following describes an operation when the DVR 13 is connected to the TV 12.

The HDMI input unit 132 detects that an apparatus is connected to the TV 12, and notifies the control circuit 127 of the connection. Upon receiving the notification, the control circuit 127 outputs data requesting pairing information, to the connected apparatus using CEC. In the DVR 13, the CEC data is notified to the control circuit 146 via the HDMI output unit 153. Upon receiving this notification, that is, upon receiving the request for pairing information, the DVR 13 notifies the control circuit 127 in the TV 12 of the apparatus category, the apparatus address, and the apparatus encryption key of the DVR 13, using CEC. Here, the apparatus category of the DVR 13 is the DVR. The apparatus address of the DVR 13 is the address (the address of the DVR 13) read from the address register 144 by the control circuit 146 in the DVR 13. The apparatus encryption key of the DVR 13 is an encryption key used by the control circuit 146 in the DVR 13 for communication. The control circuit 127 in the TV 12 stores the apparatus category, the apparatus address, and the apparatus encryption key notified from the DVR 13 to the TV 12 in this way, in the connected apparatus information register 129.

The following describes pairing.

The control circuit 115 in the remote control 11 detects that the pairing push button 110 is pressed. Upon this detection, the control circuit 115 requests the wireless transmission unit 112 to transmit a pairing request packet by broadcasting. Note that a nonce is packet authentication data randomly generated by the control circuit 115. The pairing request packet includes a nonce as a payload.

The control circuit 115 in the remote control 11 then puts the wireless reception unit 114 in the remote control 11 in a reception wait state for the predetermined time, and the control circuit 115 itself waits for a pairing acknowledgement packet for the predetermined time. When the wireless reception unit 114 in the remote control 11 receives a packet during the wait, the wireless reception unit 114 outputs the packet, that is, the received packet, to the control circuit 115 in the remote control 11. When the packet is inputted from the wireless reception unit 114 during the pairing acknowledgement packet wait, the control circuit 115 determines whether or not the packet is the pairing acknowledgement packet. When determining that the received packet is the pairing acknowledgement packet, the control circuit 115 determines whether or not a nonce included in a payload of the packet matches the nonce at the time of pairing request, namely, the nonce in the transmitted pairing request packet. When determining that the nonces match, the control circuit 115 stores apparatus information included in the payload of the packet received by the wireless reception unit 114, in the pairing information register 111. Note that the apparatus information is made up of an apparatus category, an apparatus address, and an apparatus encryption key.

When the wireless reception unit 123 receives the packet, the wireless reception unit 123 outputs the received packet to the control circuit 127. The control circuit 127 determines whether or not the packet received by the wireless reception unit 123 is the pairing request packet. When determining that the packet is the pairing request packet, the control circuit 127 requests the wireless transmission unit 125 to output the pairing acknowledgement packet. Upon obtaining this request, the wireless transmission unit 125 transmits the pairing acknowledgement packet. Here, the control circuit 127 notifies the wireless transmission unit 125 of a destination address, a nonce, the category of the TV 12, the address of the TV 12, and the encryption key of the TV 12, for the pairing acknowledgement packet to be transmitted by the wireless transmission unit 125. The wireless transmission unit 125 accordingly transmits the pairing acknowledgement packet having the notified destination address and the like. The control circuit 127 sets a source address of the packet determined as the pairing request packet, as the destination of the pairing acknowledgement packet. The control circuit 127 sets the nonce included in the determined packet, as the nonce of the paring acknowledgement packet. The control circuit 127 sets an identifier indicating the TV 12, as the category of the TV 12. The control circuit 127 sets the address read from the address register 124, as the address of the TV 12. The control circuit 127 sets a data string unique to the control circuit 127, as the encryption key of the TV 12. The control circuit 127 also reads the connected apparatus information register 129.

When any apparatus information is stored in the connected apparatus information register 129, the control circuit 127 notifies the wireless transmission unit 125 of an apparatus category, an apparatus address, and an apparatus encryption key included in the apparatus information. The control circuit 127 further stores the source address included in the packet determined as the pairing request packet, in the pairing information register 126.

Figure 13:
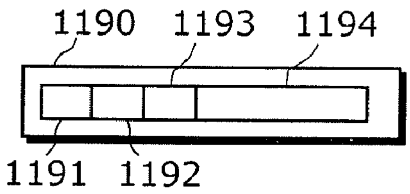
FIG. 13 is a diagram showing a structure of a pairing request packet in the embodiment A of the present invention.

FIG. 13 shows a structure of a pairing request packet.

In FIG. 13, numeral 1190 denotes a pairing request packet. Numeral 1191 denotes a destination address. Numeral 1192 denotes a source address. Numeral 1193 denotes a packet type. Numeral 1194 denotes a nonce. Here, an identifier indicating broadcasting is set in the destination address 1191, and an identifier indicating a pairing request is set in the packet type 1193.

Figure 14:
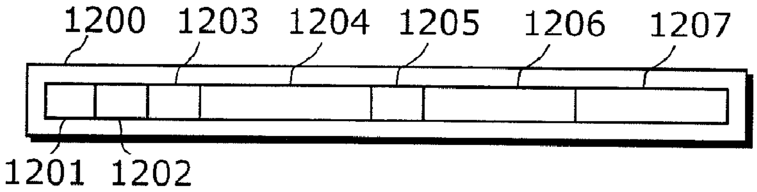
FIG. 14 is a diagram showing a structure of a pairing acknowledgement packet in the embodiment A of the present invention.

FIG. 14 shows a structure of a pairing acknowledgement packet. Numeral 1200 denotes a pairing acknowledgement packet. Numeral 1201 denotes a destination address. Numeral 1202 denotes a source address. Numeral 1203 denotes a packet type. Numeral 1204 denotes a nonce. Numeral 1205 denotes an apparatus type. Numeral 1206 denotes an apparatus address. Numeral 1207 denotes an apparatus encryption key. Here, an identifier indicating a pairing acknowledgement packet is set in the packet type 1203.

Figure 15:
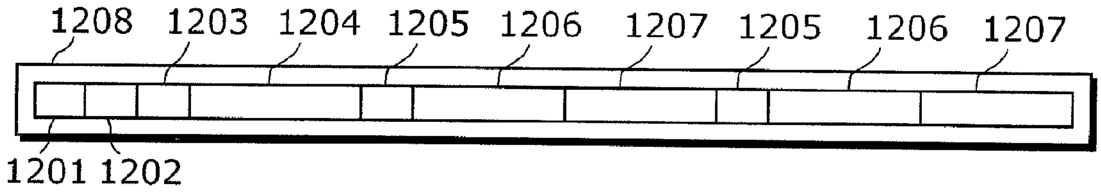
FIG. 15 is a diagram showing a structure of a pairing acknowledgement packet including a plurality of sets of apparatus information in the embodiment A of the present invention.

FIG. 15 shows that the apparatus type 1205, the apparatus address 1206, and the apparatus key information 1207 are repeated in the case of including information of a plurality of apparatuses.

In FIG. 15, numeral 1208 denotes a pairing acknowledgement packet holding information of a plurality of apparatuses. The pairing acknowledgement packet 1208 contains a plurality of sets of apparatus data which are each composed of the apparatus type 1205, the apparatus address 1206, and the apparatus key information 1207. Different sets of apparatus data are data of different apparatuses.

Thus, the pairing information of the DVR 13 is stored in the TV 12 when the DVR 13 is connected to the TV 12, and notified to the remote control 11 from the TV 12 when the remote control 11 and the TV 12 are paired with each other. This allows the DVR 13 to be operated by the remote control 11, without pairing the remote control 11 and the DVR 13.

The following describes an operation when directly pairing the remote control 11 and the DVR 13 in the case where the TV 12 is not present.

When the control circuit 146 in the DVR 13 detects that the pairing push button 142 in the DVR 13 is pressed, the control circuit 146 waits for a pairing request packet for a predetermined time. When the wireless reception unit 143 in the DVR 13 receives a packet, the wireless reception unit 143 outputs the received packet to the control circuit 146. When the packet is received by the wireless reception unit 143 during the pairing request packet wait and the type of the received packet is determined as the pairing request packet, the control circuit 146 requests the wireless transmission unit 145 to output a pairing acknowledgement packet. Upon receiving this request, the wireless transmission unit 145 transmits the pairing acknowledgement packet. Note that the control circuit 146 determines whether or not the received packet is the pairing request packet, and issues the above request to the wireless transmission unit 145 when determining the received packet as the pairing request packet. At this time, the control circuit 146 notifies the wireless transmission unit 145 of a destination address, a nonce, the category of the DVR 13, the address of the DVR 13, and the encryption key of the DVR 13, for the pairing acknowledgement packet to be transmitted by the wireless transmission unit 145. The wireless transmission unit 145 accordingly transmits the pairing acknowledgement packet having the notified destination address and the like. The control circuit 146 sets a source address of the pairing request packet, as the destination of the pairing acknowledgement packet notified to the wireless transmission unit 145. The control circuit 146 sets a nonce included in the pairing request packet, as the nonce of the pairing acknowledgement packet. The control circuit 146 sets an identifier indicating the DVR 13, as the category of the DVR 13. The control circuit 146 sets the address read from the address register 144, as the address of the DVR 13. The control circuit 146 sets a data string unique to the control circuit 146, as the encryption key of the DVR 13. The control circuit 146 further stores the source address of the received pairing request packet in the pairing information register 147.

The following describes an operation when a key on the remote control 11 is pressed.

Upon detecting that a key included in the key group 116 is pressed, the control circuit 115 determines which of the tables 1, 2, and 3 the pressed key belongs to, on the basis of the tables. When the pressed key belongs to the table 1, the control circuit 115 determines the TV as a destination. When the pressed key belongs to the table 2, the control circuit 115 determines the DVR as a destination. The destination register 117 is a register for determining a destination of a key belonging to the table 3, and holds a value corresponding to either the TV 12 or the DVR 13. That is, the destination register 117 holds a value indicating the TV 12 or a value indicating the DVR 13, and designates the apparatus indicated by the held value as the destination of the key belonging to the table 3. The control circuit 115 determines the apparatus indicated by the destination register 117, as the destination of the key in the table 3. When the pressed key belongs to the table 3, the control circuit 115 reads the destination register 117. The control circuit 115 determines the TV 12 as the destination when the read value is the TV 12, and determines the DVR 13 as the destination when the read value is the DVR 13.

In the case where the TV 12 is determined as the destination, the control circuit 115 extracts apparatus information of an apparatus whose attribute is the TV 12, namely, an apparatus address and an apparatus encryption key of the apparatus, from the pairing information register 111. When the TV is determined as the destination but there is no apparatus information of an apparatus whose attribute is the TV 12, the control circuit 115 ends the processing. In the case where the DVR 13 is determined as the destination, the control circuit 115 extracts apparatus information of an apparatus whose attribute is the DVR 13, namely, an apparatus address and an apparatus encryption key of the apparatus, from the pairing information register 111. When the DVR is determined as the destination but there is no apparatus information of an apparatus whose attribute is the DVR 13, the control circuit 115 ends the processing.

The control circuit 115 sets a command which is a data string showing the pressed key, as a payload of a packet to be transmitted. The control circuit 115 further encrypts the payload by the apparatus encryption key. That is, the control circuit 115 transmits the packet having the encrypted payload. The control circuit 115 notifies the wireless transmission unit 112 of the encrypted command and the apparatus address, and requests the wireless transmission unit 112 to transmit a command packet which includes the notified command as a command and whose destination is the apparatus of the notified address. When requested to transmit the command packet by the control circuit 115, the wireless transmission unit 112 generates and transmits the command packet. After the command packet is transmitted from the wireless transmission unit 112, the control circuit 115 sets the wireless reception unit 114 in a wait state for a predetermined time. The control circuit 115 itself also enters a reception wait state for the predetermined time after the output of the command packet.

Figure 16:
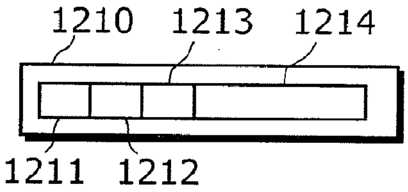
FIG. 16 is a diagram showing a structure of a command packet in the embodiment A of the present invention.

FIG. 16 shows a structure of a command packet.

Numeral 1210 denotes a command packet. Numeral 1211 denotes a destination address. Numeral 1212 denotes a source address. Numeral 1213 denotes a command type. Numeral 1214 denotes an encrypted command.

The wireless transmission unit 112 sets the apparatus address notified from the control circuit 115, as the destination address. The wireless transmission unit 112 also sets an identifier indicating a command packet, as the command type 1213. The wireless transmission unit 112 further sets the encrypted command notified from the control circuit 115, as the encrypted command 1214.

When the wireless reception unit 114 receives a packet during the reception wait, the wireless reception unit 114 notifies the control circuit 115 of the packet. The control circuit 115 determines a type of the packet. When the received packet is a rejection packet and the packet destination is the DVR, the control circuit 115 changes the value of the destination register 117 to the TV. When the received packet is a redirect packet, the control circuit 115 extracts a destination address from the redirect packet, and searches the pairing information register 111 for the same apparatus as the destination address. When the same apparatus is found, the control circuit 115 changes the value of the destination register 117 to the type of the found apparatus, and transmits the command packet again. At this time, the control circuit 115 determines the destination on the basis of the new value of the destination register 117. The value of the destination register 117 is the TV in the TV transmission state 1170, and the DVR in the DVR transmission state 1171.

The following describes an image output operation of the TV 12. The TV 12 has three image sources: a menu generated by the menu generation unit 130, a program received by the tuner 131, and an image of the DVR 13 inputted in the HDMI input unit 132. The output register 128 is a register storing information about which of these three images is to be outputted to the display 133. The output register 128 takes one of the values that are a menu, a TV, and a DVR. Whenever the image output is changed, the control circuit 127 changes the output register 128. An image generated or inputted in the menu generation unit 130, the tuner 131, or the HDMI input unit 132 is inputted to the selection circuit 134, and the selection circuit 134 selects an input on the basis of the value of the output register 128 and displays it on the display 133.

When the wireless reception unit 123 receives a packet transmitted from the wireless transmission unit 112 in the remote control 11, the wireless reception unit 123 outputs the received packet to the control circuit 127. When a source address of the outputted packet is included in the pairing information register 126, the control circuit 127 determines whether or not the packet is a command packet. When the packet is the command packet, the control circuit 127 performs an operation shown in a table 9.

TABLE 9

| | |
|---|---|
| TV key 162 | Set the value of the output register 128 to the TV. |
| DVR key 163 | Set the value of the output register 128 to the DVR, and notify the DVR to display a HDMI input through CEC. |

TABLE 9-continued

| | |
|---|---|
| Menu key 170<br>Arrow key<br>Enter key 175 | When the output register 128 shows the DVR, transmit a redirect packet.<br>When the output register 128 does not show the DVR, output the command to the menu generation unit 130.<br>When the output register 128 shows the TV, change the output register 128 to the menu. |
| Channel key | Output the command to the tuner 131. |
| Volume key | Increase or decrease the volume. |

The menu generation unit 130 generates the menu 1100 of the TV 12 shown in FIG. 3 and the program guide menu 1110 shown in FIG. 4, according to commands inputted in the TV 12. The menu generation unit 130 outputs the generated menus such as the menu 1100 of the TV 12 shown in FIG. 3, to the selection circuit 134. When the DVR switch button 1102 is executed, the menu generation unit 130 notifies the control circuit 127 of the execution of the DVR switch button 1102.

When the control circuit 127 is notified of the execution of the DVR switch button 1102 from the menu generation unit 130, the control circuit 127 changes the value of the output register 128 to the DVR, and notifies the DVR 13 of the switching to the DVR through CEC.

When the program display 1113 is selected in the program guide menu 1110 shown in FIG. 4, that is, when the enter key 75 is pressed to select a broadcast station, the menu generation unit 130 notifies the control circuit 127 of the broadcast station of the selected program display. When notified of the broadcast station of the selected program display from the menu generation unit 130, the control circuit 127 changes the value of the output register 128 to the TV, and notifies the tuner 131 of the broadcast station of the selected program display. Note that the menu generation unit 130 obtains program information from the tuner 131, and generates the program guide menu 1110.

When the value of the output register 128 is changed from the DVR to another value, the control circuit 127 notifies the DVR 13 of the DVR non-display.

The tuner 131 changes a received broadcast station according to a command inputted in the wireless reception unit 123, and outputs a received image of the broadcast station to the selection circuit 134. Moreover, when notified of the broadcast station of program display selected in the program guide menu 1110, the tuner 131 receives the notified broadcast station.

The value of the output register 128 is the TV in the tuner state 1151 (FIG. 8), the DVR 13 in the HDMI input state 1152, and the menu in the menu state 1150.

Figure 17:
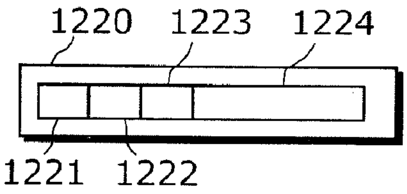
FIG. 17 is a diagram showing a structure of a redirect packet in the embodiment A of the present invention.

FIG. 17 shows a structure of a redirect packet.

Numeral 1220 denotes a redirect packet. Numeral 1221 denotes a destination address. Numeral 1222 denotes a source address. Numeral 1223 denotes a packet type. Numeral 1234 denotes a redirect destination address. An identifier indicating a redirect packet is held in the packet type 1223. Moreover, an address of an apparatus whose information is stored in the connected apparatus information register 129 and whose type is the DVR 13 is held in the redirect destination address 1224.

When the control circuit 127 is notified of the switching to the TV via the HDMI input unit 132 from the DVR 13, the control circuit 127 changes the value of the output register 128 to the TV.

The following describes an operation of the DVR 13. The DVR 13 has a recording schedule function of recording, in a HDD, a broadcast program designated by the user in advance, and a reproduction function of reproducing a recorded broadcast program.

The output register 148 is a register indicating an image that is to be outputted by the DVR 13, and takes one of the values that are a menu and a content. When the value held in the output register 148 shows the menu, a menu image is to be outputted. When the value held in the output register 148 shows the content, a content image is to be outputted. The menu generation unit 150 generates a menu designated by the control circuit 146, and outputs the generated menu data to the switch 155. The HDD drive 152 outputs a content designated by the control circuit 146, to the decoder 154. The decoder 154 decodes the inputted content to convert it to an image, and outputs the image to the switch 155. The switch 155 reads the value of the output register 148. When the value shows the menu, the switch 155 outputs the output of the menu generation unit 150 to the HDMI output unit 153. When the value shows the content, the switch 155 outputs the image of the decoder 154 to the HDMI output unit 153. The display register 149 is a register indicating whether or not an image outputted from the DVR 13 is displayed on the TV 12, and takes one of the values that are display and non-display.

When the DVR 13 is notified of the switching to the DVR via the HDMI output unit 153 from the TV 12, the control circuit 146 instructs the menu generation unit 150 to generate the menu 1120 of the DVR 13. The control circuit 146 also sets the display register 149 to show the display, namely, the value indicating that an image outputted from the DVR 13 is displayed on the TV 12. When the DVR 13 is notified of the DVR non-display via the HDMI output unit 153 from the TV 12, on the other hand, the control circuit 146 sets the display register 149 to show the non-display.

Upon receiving a packet, the wireless reception unit 143 outputs the received packet to the control circuit 146. When a source address of the received packet is an address stored in the pairing information register 147, the control circuit 146 determines whether or not the received packet is a command packet. When the received packet is the command packet, the control circuit 146 performs an operation shown in a table 10.

TABLE 10

| | |
|---|---|
| Menu key 170<br>Arrow key<br>Enter key 175 | When the display register 149 shows the non-display, abandon the packet, and request the wireless transmission unit 145 to return a rejection packet. When the output register 156 does not show the DVR, output the command to the menu generation unit 130, though abandoned in the case of the menu key 170. |
| Play key 190<br>Fast forward key 191<br>Rewind key 192<br>Stop key 193 | Output the command to the HDD drive 152. |

The menu generation unit 150 generates the menu 1120 of the DVR 13 shown in FIG. 5, the program guide menu 1110 shown in FIG. 4, the content list menu 1130 shown in FIG. 6, and the recording schedule list menu 1140 shown in FIG. 7, according to commands inputted in the DVR 13. The menu generation unit 150 outputs the generated menus to the switch 155. The menu generation unit 150 obtains program information from the tuner 151, and generates the program guide menu 1110. The menu generation unit 150 also obtains a content list from the content list 157, and generates the content list menu 1130. The menu generation unit 150 further obtains a recording schedule list from the recording schedule list 156, and generates the recording schedule list menu 1140.

When the TV switch button 1124 (FIG. 5) is pressed, the menu generation unit 150 notifies the control circuit 146 of the switching to the TV. The control circuit 146 changes the value of the display register 149 to the non-display, and notifies the TV 12 of the switching to the TV via the HDMI output unit 153. When the content display 1131 (FIG. 6) is pressed, the menu generation unit 150 notifies the control circuit 146 of a content selected by the press. The control circuit 146 requests the HDD drive 152 to reproduce the content notified from the menu generation unit 150, and changes the value of the output register 148 to the content. When the program display 1113 (FIG. 4) is pressed, the menu generation unit 150 adds a pressed program to the recording schedule list 156. When the recording schedule display 1141 is pressed, the menu generation unit 150 deletes a pressed recording schedule from the recording schedule list 156 (FIG. 12). The menu generation unit 150 also includes a clock. When the clock reaches a start time of a program scheduled to be recorded, the menu generation unit 150 notifies the tuner 151 of the recording schedule, and deletes the recording schedule from the recording schedule list 156. The tuner 151 selects a broadcast station of the recording-scheduled program notified from the menu generation unit 150, requests the HDD drive 152 to perform recording, and also notifies the HDD drive 152 of a corresponding content name. The HDD drive 152 records the content of the notified recording schedule, and adds the content to the content list 157.

When commands corresponding to the play key 190, the fast forward key 191, the rewind key 192, and the stop key 193 (FIG. 2) are notified, the HDD drive 152 respectively performs normal reproduction, fast forward reproduction, rewind reproduction, and stop.

Figure 18:
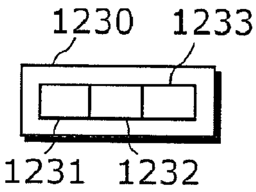
FIG. 18 is a diagram showing a structure of a rejection packet in the embodiment A of the present invention.

FIG. 18 shows a structure of a rejection packet.

Numeral 1230 denotes a rejection packet. Numeral 1231 denotes a destination address. Numeral 1232 denotes a source address. Numeral 1233 denotes a packet type. A source address of a command packet is held in the destination address 1191, and an identifier indicating a rejection packet is held in the packet type 1233.

According to the embodiment A described above, the problem of inconvenience associated with a wireless remote control that controls a plurality of apparatuses, namely, the need to perform pairing with each of the plurality of apparatuses, can be eliminated. Take, for example, the remote control 11 that controls the TV 12 and the DVR (Digital Video Recorder) 13 through wireless communication, as concisely shown in FIG. 3 and the like. When the DVR 13 is connected to the TV 12 using HDMI, wireless control information such as an address and an encryption key of the DVR 13 is transmitted to the TV 12 using CEC, and the TV 12 stores the wireless control information. When performing pairing between the TV 12 and the remote control 11, the TV 12 not only notifies the remote control 11 of wireless control information of the TV 12, but also notifies the remote control 11 of the stored wireless control information of the DVR 13. This enables the user to control the DVR 13 by the remote control 11, without performing pairing between the remote control 11 and the DVR 13.

Embodiment B

The embodiment B relates to an identification method, a remote control apparatus, a reception apparatus, and a wireless remote control system. The embodiment B particularly relates to an identification method, a remote control apparatus, a reception apparatus, and a wireless remote control system whereby a reception apparatus present within a range of sight of the user can automatically identify a remote control apparatus without initial installation/setup or switching operation.

An identification method in the embodiment B is an identification method in which a reception apparatus identifies a remote control apparatus in a wireless remote control system. In the identification method, when the remote control apparatus detects that an operation of a button provided on the remote control apparatus is performed, the remote control apparatus transmits an identifier indicating the remote control apparatus via a first communication medium transmittable only within a range of sight, and transmits the identifier and operation information for operating the reception apparatus via a second communication medium. The reception apparatus obtains the identifiers transmitted from the remote control apparatus via the first communication medium and the second communication medium, and determines whether or not the identifiers match, thereby identifying a transmitter.

According to this identification method, when the user operates the button or the like, the remote control apparatus transmits the identifier indicating the operated remote control apparatus and the operation information to the reception apparatus, via the first communication medium transmittable only within the range of sight and via the second communication medium. The reception apparatus can automatically determine, from the identifiers obtained via the first communication medium and the second communication medium, whether or not the two communication media are from the same transmitter.

A wireless remote control system in the embodiment B is a wireless remote control system including: a remote control apparatus that transmits operation information corresponding to a key operation; and a reception apparatus that receives the operation information transmitted from the remote control apparatus. The remote control apparatus includes: at least one operation key; an operation information generation unit that, upon detecting that an operation of the operation key is performed, generates operation information corresponding to the operation key; an identifier holding unit that holds an identifier indicating a generator of the operation information; a first transmission unit that transmits the identifier via a first communication medium transmittable only within a range of sight; and a second transmission unit that transmits the identifier and the operation information via a second communication medium. The reception apparatus includes: a first reception unit that receives the identifier indicating the remote control apparatus, via the first communication medium; a second reception unit that receives the operation information and the identifier transmitted from the remote control apparatus via the second communication medium; an identifier determination unit that obtains the identifiers from the first communication medium and the second communication medium, and determines whether or not the identifiers match, thereby identifying a transmitter; and an operation execution unit that executes an operation corresponding to the operation information received from the second communication medium, when the determination unit determines that the identifiers match.

According to this wireless remote control system in the embodiment B, when the user operates the operation key on the remote control apparatus, the remote control apparatus transmits the identifier indicating the operated remote control apparatus and the operation information to the reception apparatus, via the first communication medium transmittable only within the range of sight and via the second communication medium. The reception apparatus obtains the two identifiers from the first communication medium and the second communication medium, and determines whether or not the obtained two identifiers match. Only when the two identifiers match, the reception apparatus executes the operation requested by the remote control apparatus.

According to the embodiment B, even in a situation where, for example, a plurality of remote control apparatuses transmit operation information to a reception apparatus, the reception apparatus can automatically recognize only the target remote control apparatus. Here, the user does not need to perform presetting such as a switching operation or installation/setup for enabling the reception apparatus to specify the remote control apparatus.

Moreover, an identification method in the embodiment B is an identification method in which a reception apparatus identifies a remote control apparatus in a wireless remote control system. In the identification method, when the remote control apparatus detects that an operation of a button provided on the remote control apparatus is performed, the remote control apparatus transmits an identifier indicating the remote control apparatus via a first communication medium transmittable only within a range of sight, and transmits the identifier and operation information for operating the reception apparatus via a second communication medium. The reception apparatus obtains the identifiers transmitted from the remote control apparatus via the first communication medium and the second communication medium, and determines whether or not the identifiers match, thereby identifying a transmitter.

According to this identification method, when the user operates the button or the like, the remote control apparatus transmits the identifier indicating the operated remote control apparatus and the operation information to the reception apparatus, via the first communication medium transmittable only within the range of sight and via the second communication medium. The reception apparatus can automatically determine, from the identifiers obtained via the first communication medium and the second communication medium, whether or not the two communication media are from the same transmitter.

In this way, even in a situation where, for example, a plurality of remote control apparatuses transmit operation information to a reception apparatus, the reception apparatus can automatically recognize only the target remote control apparatus. Here, the user does not need to perform presetting such as a switching operation or installation/setup for enabling the reception apparatus to specify the remote control apparatus.

Moreover, in the identification method, infrared radiation may be used as the first communication medium.

According to this identification method, when the user operates the button or the like, the remote control apparatus transmits, to the reception apparatus, the identifier indicating the remote control apparatus via infrared radiation, and the identifier and the operation information corresponding to the button operation via the second communication medium. The reception apparatus can automatically determine, from the identifier obtained via infrared radiation and the identifier obtained via the second communication medium, whether or not the two communication media are from the same transmitter.

In this way, even in a situation where, for example, a plurality of remote control apparatuses transmit operation information to a reception apparatus, the reception apparatus can automatically recognize only the remote control apparatus linearly facing the reception apparatus by using infrared radiation directionality. Here, the user does not need to perform presetting such as a switching operation or installation/setup for enabling the reception apparatus to specify the remote control apparatus.

Moreover, in the identification method, radio waves may be used as the second communication medium.

According to this identification method, when the user operates the button or the like, the remote control apparatus transmits the identifier indicating the operated remote control apparatus and the operation information to the reception apparatus, via infrared radiation and via radio waves. The reception apparatus can automatically determine, from the identifier obtained via infrared radiation and the identifier obtained via radio waves, whether or not the two communication media are from the same transmitter.

In this way, even in a situation where, for example, a plurality of remote control apparatuses transmit operation information to a reception apparatus across an obstacle, the reception apparatus can automatically recognize only the target remote control apparatus. Here, the user does not need to perform presetting such as a switching operation or installation/setup for enabling the reception apparatus to specify the remote control apparatus.

Moreover, a wireless remote control system including: a remote control apparatus that transmits operation information corresponding to a key operation; and a reception apparatus that receives the operation information transmitted from the remote control apparatus may be used. The remote control apparatus includes: at least one operation key; an operation information generation unit that, upon detecting that an operation of the operation key is performed, generates operation information corresponding to the operation key; an identifier holding unit that holds an identifier indicating a generator of the operation information; a first transmission unit that transmits the identifier via a first communication medium transmittable only within a range of sight; and a second transmission unit that transmits the identifier and the operation information via a second communication medium. The reception apparatus includes: a first reception unit that receives the identifier indicating the remote control apparatus, via the first communication medium; a second reception unit that receives the operation information and the identifier transmitted from the remote control apparatus via the second communication medium; an identifier determination unit that obtains the identifiers from the first communication medium and the second communication medium, and determines whether or not the identifiers match, thereby identifying a transmitter; and an operation execution unit that executes an operation corresponding to the operation information received from the second communication medium, when the determination unit determines that the identifiers match.

According to this wireless remote control system, when the user operates the operation key on the remote control apparatus, the remote control apparatus transmits the identifier indicating the operated remote control apparatus and the operation information to the reception apparatus, via the first communication medium transmittable only within the range of sight and via the second communication medium. The reception apparatus obtains the two identifiers from the first communication medium and the second communication medium, and determines whether or not the obtained two identifiers match. Only when the two identifiers match, the reception apparatus executes the operation requested by the remote control apparatus.

In this way, even in a situation where, for example, a plurality of remote control apparatuses transmit operation information to a reception apparatus, the reception apparatus can identify only an operation of the target remote control apparatus. Here, the user does not need to perform presetting such as a switching operation or installation/setup for enabling the reception apparatus to specify the remote control apparatus.

Moreover, in the wireless remote control system, infrared radiation may be used as the first communication medium in the remote control apparatus.

In this wireless remote control system, when the user operates the operation key on the remote control apparatus, the identifier indicating the remote control apparatus is transmitted via infrared radiation, and the identifier and the operation information corresponding to the key operation are transmitted via the second communication medium.

According to this, when transmitting the operation information to the reception apparatus, the user does not need to perform presetting such as a switching operation or installation/setup for specifying the remote control apparatus. Hence it is possible to suppress such a malfunction that causes an unintended TV to operate because the remote control apparatus cannot be appropriately identified due to a failure to perform presetting. In addition, the operation can be executed only when the remote control apparatus and the reception apparatus are positioned linearly facing each other Moreover, in the wireless remote control system, radio waves may be used as the second communication medium in the remote control apparatus.

In this wireless remote control system, when the user operates the operation key on the remote control apparatus, the identifier indicating the remote control apparatus is transmitted via infrared radiation, and the identifier and the operation information corresponding to the key operation are transmitted via radio waves.

According to this, even in the case of performing bulk data transfer using omnidirectional radio waves capable of bidirectional communication, the reception apparatus linearly facing the remote control apparatus can automatically identify the target remote control apparatus. Here, the user does not need to perform presetting such as a switching operation or installation/setup for specifying the remote control apparatus.

Moreover, in the wireless remote control system, the identifier determination unit in the reception apparatus may store the identifier obtained via the first communication medium and the identifier obtained via the second communication medium. In this case, the identifier determination unit determines whether or not the stored identifiers match, thereby identifying the transmitter.

According to this wireless remote control system, the reception apparatus receives the identifier indicating the remote control apparatus via the first communication medium, and further receives the operation information and the identifier via the second communication medium. The reception apparatus stores the two identifiers obtained via the first communication medium and the second communication medium. Only when the stored two identifiers match, the reception apparatus executes the operation requested by the remote control apparatus.

In this way, even in the case where, for example, the first communication medium and the second communication medium differ in propagation speed, the reception apparatus can automatically identify only the target remote control apparatus. This makes it possible to execute only an intended operation, with there being no need to perform presetting such as a switching operation or installation/setup for specifying the remote control apparatus.

Embodiment B1

The following describes the wireless remote control system 2 in an embodiment B1 of the present invention, with reference to drawings.

Figure 19:
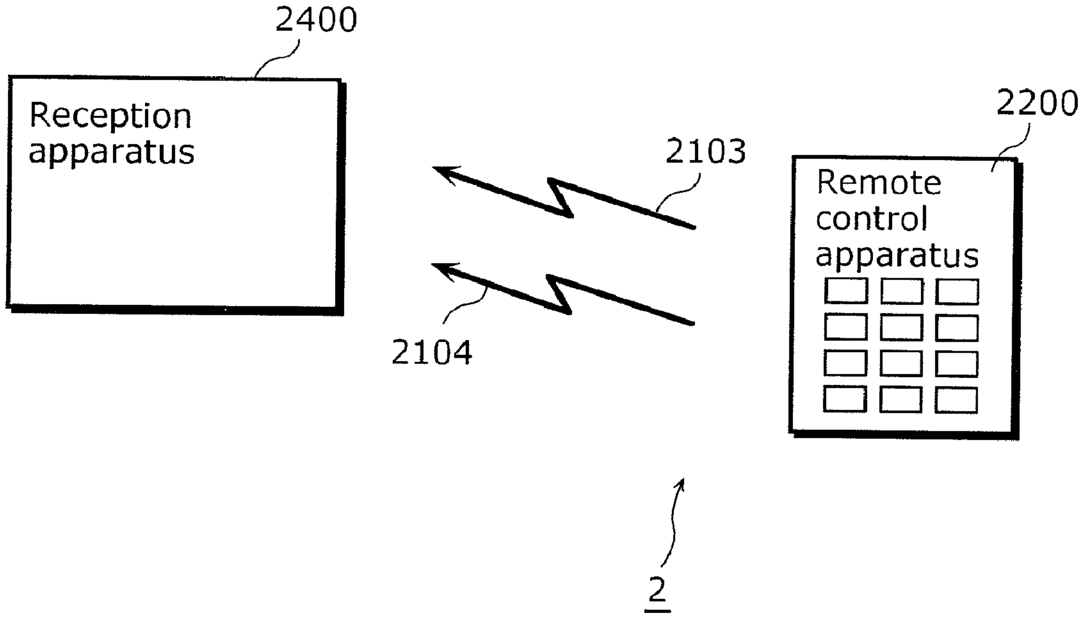
FIG. 19 is a diagram showing a wireless remote control system including a remote control apparatus and a reception apparatus in an embodiment B1 of the present invention.

FIG. 19 is a diagram showing a structure of the wireless remote control system 2 that includes the remote control apparatus 2200 and the reception apparatus 2400.

In FIG. 19, the remote control apparatus 2200 and the reception apparatus 2400 are capable of communicating via the first communication medium 2103 transmittable within a range of sight and via a second communication medium 2104. In detail, the range of sight mentioned here is, for example, a range that is visible from a position of an apparatus communicating by the first communication medium 2103. For instance, a transmission range of the first communication medium 2103 constitutes a part of a transmission range of the second communication medium 2104. The transmission range of the first communication medium 2103 is narrower than the transmission range of the second communication medium 2104.

The remote control apparatus 2200 can transmit operation information and an identifier to the reception apparatus 2400 via the first communication medium 2103 transmittable within the range of sight and via the second communication medium 2104, when the user of the wireless remote control system 2 operates an operation key provided on the remote control apparatus 2200. Here, the operation information corresponds to the operation key, and the identifier indicates the remote control apparatus 2200 which is a transmitter. Note that the remote control apparatus 2200 transmits only the identifier via the first communication medium 2103 and transmits the identifier and the operation information via the second communication medium 2104, as described in detail later. The remote control apparatus 2200 is not limited to a TV remote control provided with a plurality of push button switches. For instance, the remote control apparatus 2200 may be a pointing device such as a mouse, a trackball, and a joystick, a remote control apparatus having a touch panel, or the like.

The reception apparatus 2400 receives the identifier indicating the remote control apparatus 2200 from the remote control apparatus 2200, via the first communication medium 2103 transmittable within the range of sight. The reception apparatus 2400 also receives the identifier and the operation information showing the operation performed by the user on the remote control apparatus 2200, via the second communication medium 2104. The reception apparatus 2400 determines whether or not the two identifiers obtained from the first communication medium 2103 and the second communication medium 2104 match. Only when identifying (determining) the match, the reception apparatus 2400 executes a process of the operation requested by the user, that is, a process of the operation shown by the operation information. In this way, the reception apparatus 2400 can identify only the operation from the target remote control apparatus 2200, with there being no need to perform presetting such as a switching operation or installation/setup for enabling the reception apparatus 2400 to specify the remote control apparatus 2200. In other words, the reception apparatus 2400 can distinguish between an operation signal from the remote control apparatus 2200 and an operation signal from other than the remote control apparatus 2200. The target remote control apparatus mentioned here is the remote control apparatus 2200. Note that the reception apparatus 2400 is not limited to a TV, and may be a remotely-operable electronic appliance or the like such as a DVD recorder. To perform identification (process) in the reception apparatus 2400 means, in detail, that the wireless remote control system 2 constituting the whole performs the process (identification) by one part (the reception apparatus 2400) of the whole (the wireless remote control system 2). That is, to perform identification (process) in the reception apparatus 2400 means that the part (the reception apparatus 2400) performs the process (identification).

The first communication medium 2103 transmittable within the range of sight is used to transmit the identifier indicating the remote control apparatus 2200. Note that the first communication medium 2103 may be any communication medium so long as it is transmittable only within the range of sight. For example, the first communication medium 2103 may be infrared radiation having directionality, omnidirectional acoustic waves or ultrasonic waves, or the like.

The second communication medium 2104 is used to transmit the identifier indicating the remote control apparatus 2200 and the operation information which is generated when the user operates the button or the like. Note that the second communication medium 2104 may be any communication medium so long as operation information can be transmitted. For example, the second communication medium 2104 may be radio waves based on the communication standard established in IEEE 802.11, or a communication medium such as Bluetooth based on the communication standard established in IEEE 802.15.1.

The following describes the remote control apparatus 2200 used in the wireless remote control system 2 in the embodiment B1 of the present invention.

Figure 20:
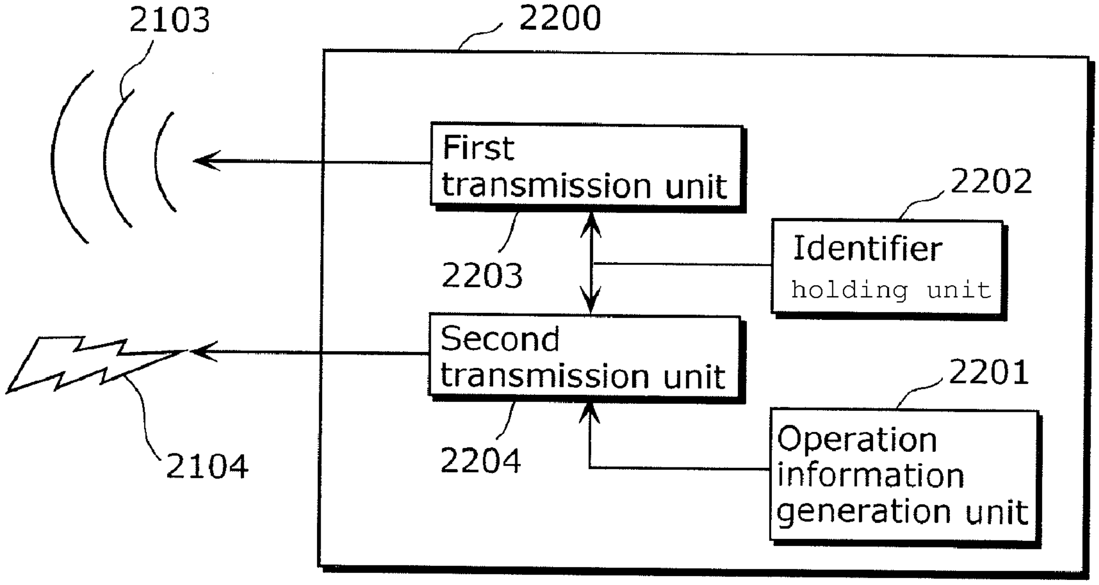
FIG. 20 is a block diagram showing an internal structure of the remote control apparatus in the embodiment B1 of the present invention.

FIG. 20 is a block diagram showing components of the remote control apparatus 2200 in the embodiment B1. The remote control apparatus 2200 according to the present invention is composed of an operation information generation unit 2201, an identifier holding unit 2202, a first transmission unit 2203, and a second transmission unit 2204.

In detail, the term "be composed of" used here means, for example, that the whole (the remote control apparatus 2200) includes each of the parts (the operation information generation unit 2201 and the like). The whole may further include a part other than the parts, or may be made up of only the parts.

Note that the operation information generation unit 2201 and the like are each a functional block corresponding to a function of the remote control apparatus 2200. Functions of the remote control apparatus 2200 include the functions of the operation information generation unit 2201 and the like. The function of each functional block such as the operation information generation unit 2201 may be, for example, a function realized by one object in a computer program of an object-oriented language. Alternatively, the function of each functional block may be a function realized by two or more objects. Moreover, the function of each functional block may be a function realized by one mathematical scheme. Furthermore, at least one part of the functions of the remote control apparatus 2200 described below may be a function realized by hardware.

The following describes an operation of the remote control apparatus 2200 having the above structure, with reference to drawings.

The operation information generation unit 2201 detects that the user operates an operation key provided on the remote control apparatus 2200. Upon this detection, the operation information generation unit 2201 generates operation information (information specifying the operation) corresponding to the operation key, and outputs the generated operation information to the second transmission unit 2204. Note that, when generating the operation information, the operation information generation unit 2201 may use data of correspondence between operation keys and operation information stored in a storage memory or the like provided, for example, in the operation information generation unit 2201. As an alternative, the operation information generation unit 2201 may use a data processing result of information relating to the operation key. In detail, the operation information generation unit 2201 may include, for example, a correspondence storage unit that stores, in correspondence with each operation key, operation information specifying an operation of the operation key. The operation information generation unit 2201 may then generate appropriate operation information, by obtaining operation information corresponding to the operated operation key in the correspondence storage unit. As an alternative, the operation information generation unit 2201 may have, for example, a calculation function of calculating appropriate operation information by performing computation on an operation key, and generate appropriate operation information through this calculation.

The identifier holding unit 2202 holds the identifier uniquely indicating the remote control apparatus 2200, and outputs the held identifier to each of the first transmission unit 2203 and the second transmission unit 2204. Note that the identifier may be any information that can uniquely indicate the remote control apparatus 2200. For instance, a Media Access Control address (MAC address) assigned to a network appliance for wireless communication may be wholly or partly used as the identifier. In more detail, the identifier may be, for example, lower 24 bits of the MAC address, or bit data generated by converting a time at which the user operates the operation key into bits. Moreover, information corresponding to the remote control apparatus 2200 may be generated in advance and held in the identifier holding unit 2202 as the identifier. Alternatively, the identifier may be generated by the identifier holding unit 2202 or the like and held in the identifier holding unit 2202, when the operation key is operated. The timing of generating the identifier may be the same as the timing of generating the operation information, or a time difference may be provided between the generation of the identifier and the generation of the operation information so that the identifier is generated before or after the operation information. The identifier holding unit 2202 may generate the identifier synchronously with the generation of the operation information, or asynchronously with the generation of the operation information. Note that the held identifier is, for example, data for identifying the remote control apparatus 2200 from among predetermined apparatuses which each have a possibility of transmitting an identifier to the reception apparatus 2400.

The first transmission unit 2203 transmits the identifier held in the identifier holding unit 2202, via the first communication medium 2103 transmittable within the range of sight of the remote control apparatus 2200.

The second transmission unit 2204 transmits the operation information generated in the operation information generation unit 2201 and the identifier held in the identifier holding unit 2202, via the second communication medium 2104. The timing of transmission by the second transmission unit 2204 may be the same as the timing of transmission by the first transmission unit 2203, or a time difference may be provided between the transmission by the first transmission unit 2203 and the transmission by the second transmission unit 2204 so that the transmission by the second transmission unit 2204 is before or after the transmission by the first transmission unit 2203.

The following describes an operation of the remote control apparatus 2200 used in the wireless remote control system 2 in the embodiment B1 of the present invention.

Figure 21:
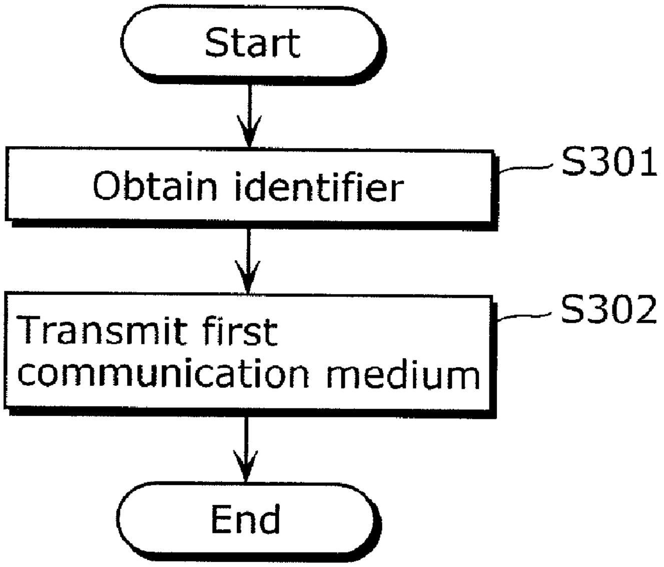
FIG. 21 is a flowchart showing an operation of the remote control apparatus in the embodiment B1 of the present invention.

FIG. 21 is a flowchart of a process of transmitting the identifier from the first transmission unit 2203 in the remote control apparatus 2200.

First, upon detecting that the user operates the operation key, the remote control apparatus 2200 obtains the identifier from the identifier holding unit 2202, and outputs the obtained identifier to the first transmission unit 2203 (Step S301).

When the identifier is notified (outputted) to the first transmission unit 2203 from the identifier holding unit 2202, the first transmission unit 2203 transmits the outputted identifier using, as a carrier, the above-mentioned first communication medium 2103 through which information can be transmitted within the range of sight of the remote control apparatus 2200. The first transmission unit 2203 then ends the operation (Step S302).

Figure 22:
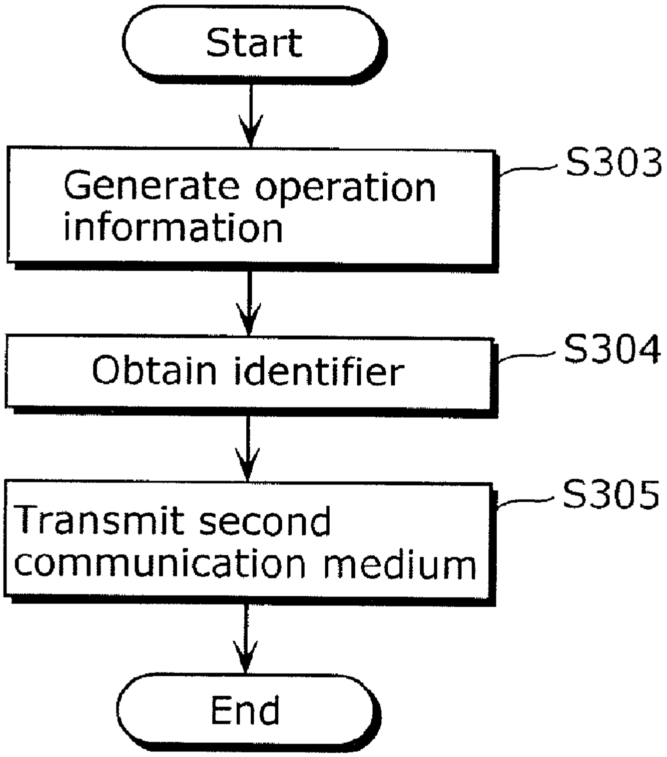
FIG. 22 is a flowchart showing an operation of the remote control apparatus in the embodiment B1 of the present invention.

FIG. 22 is a flowchart of a process of transmitting the identifier and the operation information from the second transmission unit 2204 in the remote control apparatus 2200.

First, the operation information generation unit 2201 generates the operation information, and outputs the generated operation information to the second transmission unit 2204 (Step S303).

Upon detecting that the user operates the operation key, the remote control apparatus 2200 obtains the identifier held in the identifier holding unit 2202, and outputs the obtained identifier to the second transmission unit 2204 (Step S304).

When the identifier and the operation information are notified to the second transmission unit 2204 respectively from the identifier holding unit 2202 and the operation information generation unit 2201, the second transmission unit 2204 transmits the notified identifier and operation information using the second communication medium 2104 as a carrier. The second transmission unit 2204 then ends the operation (Step S305). Note that the generation of the operation information and the obtainment of the identifier may be performed in any order, or may be performed in parallel.

The first transmission unit 2203 and the second transmission unit 2204 as a whole may be realized as one transmission unit. Moreover, the operation of the second transmission unit 2204 may be synchronized with the operation of the first transmission unit 2203, or a time difference may be provided between the operation of the first transmission unit 2203 and the operation of the second transmission unit 2204.

As described above, according to the embodiment B1, when the user operates the operation key provided on the remote control apparatus 2200, the operation information corresponding to the operation key and the identifier indicating the transmitter are automatically generated. The identifier and the operation information are transmitted using the first communication medium 2103 transmittable only within the range of sight and the second communication medium 2104.

Thus, in the case of transmitting the operation information from the remote control apparatus 2200 to the reception apparatus 2400, the user does not need to perform presetting such as a switching operation or installation/setup for specifying the remote control apparatus 2200, on the reception apparatus 2400. For instance, even when the identification of the remote control apparatus 2200 cannot be appropriately made due to the user's setting mistake, it is possible to suppress such a malfunction that causes an unintended TV to operate. Though the identifier holding unit 2202 generates the identifier at the timing of the operation of the operation key in the remote control apparatus 2200 in the embodiment B1, the identifier may be generated and held in the identifier holding unit 2202 in advance.

The following describes the reception apparatus 2400 used in the wireless remote control system 2 in the embodiment B1 of the present invention.

Figure 23:
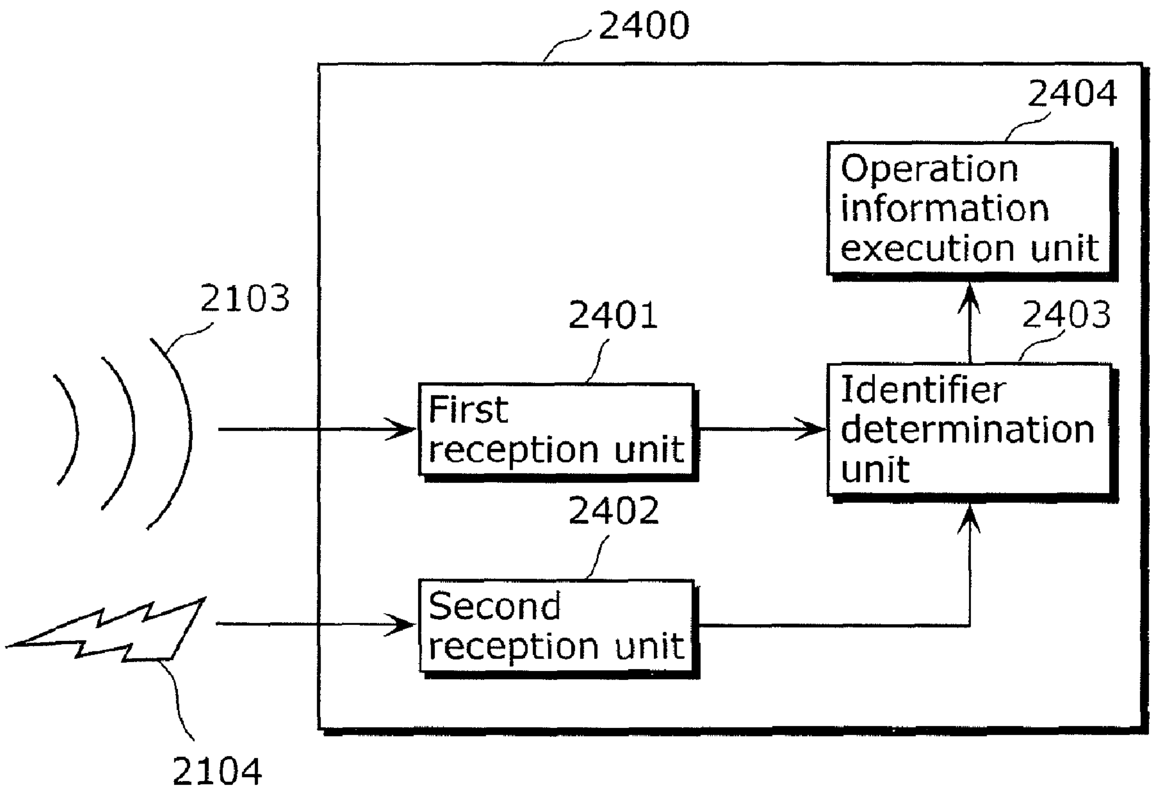
FIG. 23 is a block diagram showing an internal structure of the reception apparatus in the embodiment B1 of the present invention.

FIG. 23 is a block diagram showing components of the reception apparatus 2400 in the embodiment B1. The reception apparatus 2400 according to the present invention is composed of a first reception unit 2401, a second reception unit 2402, an identifier determination unit 2403, and an operation information execution unit 2404.

The following describes an operation of the reception apparatus 2400 having the above structure, with reference to drawings.

The first reception unit 2401 receives the identifier via the first communication medium 2103. Upon this reception, the first reception unit 2401 notifies the identifier determination unit 2403 of the reception.

The second reception unit 2402 receives the operation information and the identifier via the second communication medium 2104. Upon this reception, the second reception unit 2402 notifies the identifier determination unit 2403 of the reception.

Upon receiving the notification from the first reception unit 2401, the identifier determination unit 2403 obtains the identifier from the first communication medium 2103. Moreover, upon receiving the notification from the second reception unit 2402, the identifier determination unit 2403 obtains the identifier and the operation information from the second communication medium 2104. The identifier determination unit 2403 determines whether or not the obtained identifiers match. Only when identifying (determining) the match, the identifier determination unit 2403 outputs the operation information to the operation information execution unit 2404. That is, the identifier determination unit 2403 determines whether or not the identifier obtained from the first communication medium 2103 and the identifier obtained from the second communication medium 2104 match. When determining that the identifiers do not match, the identifier determination unit 2403 does not output the operation information obtained from the second communication medium 2104, to the operation information execution unit 2404. When determining that the identifiers match, on the other hand, the identifier determination unit 2403 outputs the obtained operation information to the operation information execution unit 2404. Note that the identifier determination unit 2403 may use any algorithm for determining the match.

Upon detecting the operation information outputted from the identifier determination unit 2403 to the operation information execution unit 2404, the operation information execution unit 2404 executes an operation corresponding to the outputted operation information.

Figure 24:
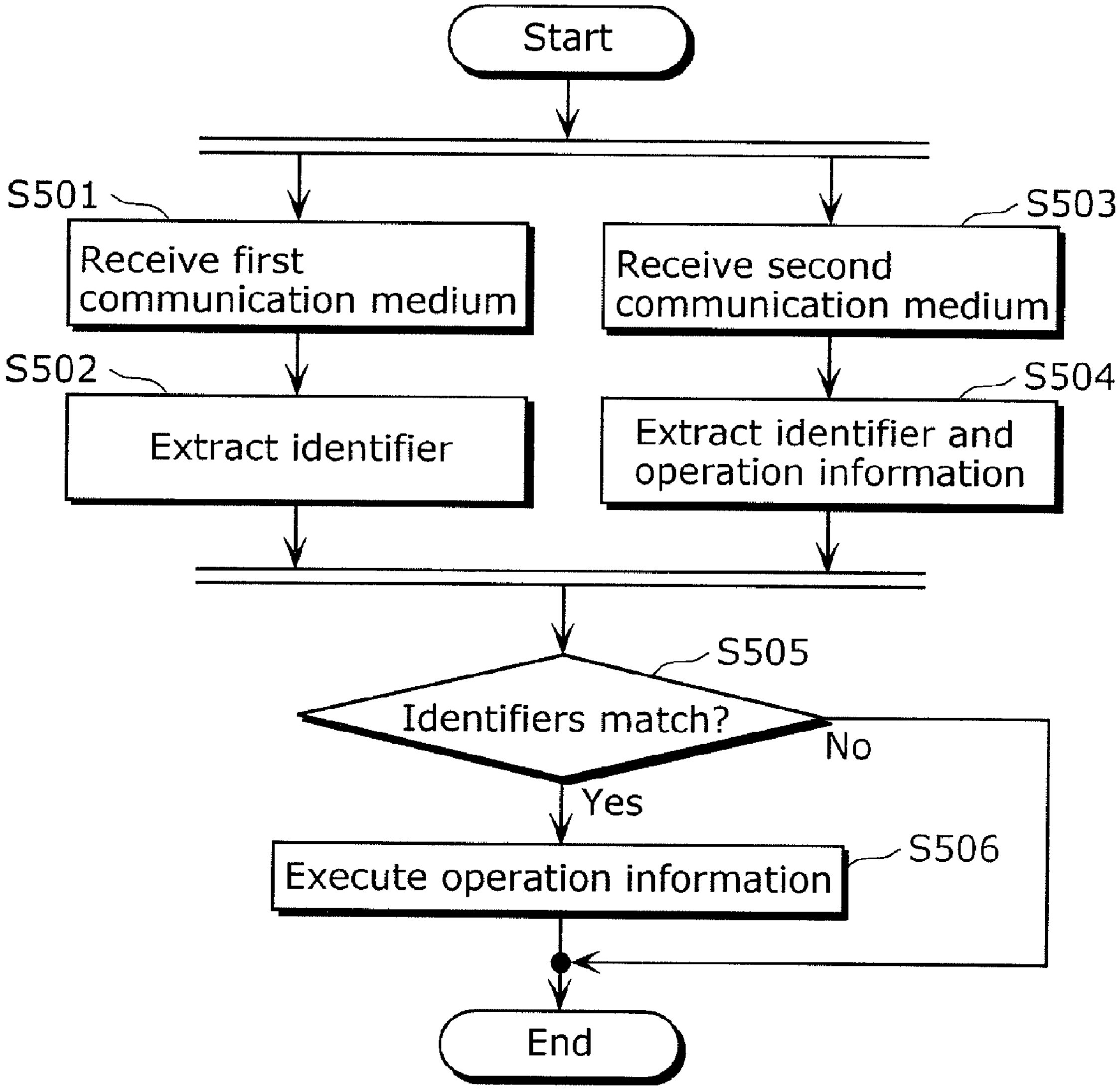
FIG. 24 is a flowchart showing an operation of the reception apparatus in the embodiment B1 of the present invention.

FIG. 24 is a flowchart of the operation of the reception apparatus 2400 in the embodiment B1.

First, the reception apparatus 2400 receives, in the first reception unit 2401, the data transmitted from the remote control apparatus 2200 to the reception apparatus 2400 via the first communication medium 2103 (Step S501). That is, in Step S501, the first reception unit 2401 receives the identifier via the first communication medium 2103.

The reception apparatus 2400 also receives, in the second reception unit 2402, the data transmitted from the remote control apparatus 2200 to the reception apparatus 2400 via the second communication medium 2104 (Step S503).

Next, the reception apparatus 2400 obtains, in the identifier determination unit 2403, the identifier from the first communication medium 2103 (Step S502). In detail, in Step S502, the identifier determination unit 2403 extracts the identifier from the data received by the first reception unit 2401 earlier in Step S501.

The reception apparatus 2400 also obtains (extracts), in the identifier determination unit 2403, the operation information and the identifier from the second communication medium 2104 (Step S504). In detail, in Step S504, the identifier determination unit 2403 extracts the identifier from the data received by the second reception unit 2402 earlier in Step S503. Note that the identifier obtainment timing (extraction timing) may be a timing at which both the reception of the identifier from the first communication medium 2103 and the reception of the operation information and the identifier from the second communication medium 2014 are detected in the first reception unit 2401 and the second reception unit 2402 (that is, the extraction may be performed after both of these receptions). Alternatively, the identifier may be obtained from the first communication medium 2103 before or after the identifier is obtained from the second communication medium 2104.

The identifier determination unit 2403 determines whether or not the identifier received via the first communication medium 2103 and the identifier received via the second communication medium 2104 match. When identifying (determining) the match, the identifier determination unit 2403 outputs the obtained operation information to the operation information execution unit 2404 (Step S505: Yes). When the identifiers do not match, the remote control apparatus 2200 ends the operation in FIG. 24 (Step S505: No).

The operation information execution unit 2404 obtains the operation information outputted from the identifier determination unit 2403 (Step S505: Yes), and executes the process of the operation shown by the obtained operation information, before ending the operation (Step S506).

According to the embodiment B1 of the present invention, even in a situation where, for example, a plurality of remote control apparatuses transmit operation information to the reception apparatus 2400, the reception apparatus 2400 can identify only the operation from the target remote control apparatus. Here, the user does not need to perform presetting such as a switching operation or installation/setup for enabling the reception apparatus 2400 to specify the remote control apparatus 2200.

According to this wireless remote control system 2, the object of providing an identification method, a remote control apparatus, a reception apparatus, and a wireless remote control system whereby a reception apparatus present within a range of sight of the user can automatically identify the remote control apparatus 2200 without initial installation/setup or switching operation can be achieved.

That is, when the user operates the button or the like, the remote control apparatus 2200 transmits the identifier indicating the remote control apparatus 2200 operated by the user and the operation information to the reception apparatus 2400, via the first communication medium 2103 transmittable only within the range of sight and via the second communication medium 2104. The reception apparatus 2400 determines, from the identifiers obtained via the first communication medium 2103 and the second communication medium 2104, whether or not the two communication media (the first communication medium 2103, the second communication medium 2104) are from the same transmitter. Thus, the remote control apparatus 2200 can be automatically identified.

The following gives more detailed description. Note that the following merely describes an example and the present invention is not limited to such.

The wireless remote control system 2 includes the remote control apparatus 2200 and the reception apparatus 2400. The remote control apparatus 2200, when operated by the user, transmits operation information specifying the operation performed by the user to the reception apparatus 2400, thereby causing the reception apparatus 2400 to perform a process of the operation. The reception apparatus 2400 receives the operation information transmitted from the remote control apparatus 2200, and performs the process of the received operation information.

The remote control apparatus 2200 includes the operation information generation unit 2201, the identifier holding unit 2202, the first transmission unit 2203, and the second transmission unit 2204.

The first transmission unit 2203 transmits the identifier to the reception apparatus 2400 by infrared radiation (the first communication medium 2103). Since the transmission is performed by infrared radiation, the range of transmission of the identifier by this transmission is the range of sight from the position of the remote control apparatus 2200. Note that the first transmission unit 2203 may perform the infrared transmission when the user operates the remote control apparatus 2200. That is, for example, the first transmission unit 2203 may perform the infrared transmission at the same time as when the second transmission unit 2204 described in detail later transmits the operation information and the like as a result of the operation of the user.

Moreover, the second transmission unit 2204 transmits the operation information and the identifier to the reception apparatus 2400 by radio waves (the second communication medium 2104). Here, the identifier transmitted from the second transmission unit 2204 matches the identifier transmitted from the first transmission unit 2203. As an example, the identifier transmitted from the second transmission unit 2204 is the same as the identifier transmitted from the first transmission unit 2203. Note that, for example, the second transmission unit 2204 transmits the operation information of the operation and the identifier when the user performs the operation on the remote control apparatus 2200. As mentioned earlier, the first transmission unit 2203 transmits the identifier by infrared radiation, for example, at the same time as the transmission by the second transmission unit 2204.

The operation information generation unit 2201 generates the operation information for specifying the operation performed by the user on the remote control apparatus 2200. The operation information generated by the operation information generation unit 2201 is transmitted from the second transmission unit 2204 to the reception apparatus 2400 by radio waves.

The identifier holding unit 2202 holds, i.e., stores, the identifier transmitted by the first transmission unit 2203 and the identifier transmitted by the second transmission unit 2204. In the case where the two identifiers are the same, the identifier holding unit 2202 holds one identifier.

The reception apparatus 2400 includes the first reception unit 2401, the second reception unit 2402, the identifier determination unit 2403, and the operation information execution unit 2404.

The first reception unit 2401 receives the identification information transmitted from the first transmission unit 2203 in the remote control apparatus 2200 by infrared radiation.

The second reception unit 2402 receives the identification information and the operation information transmitted from the second transmission unit 2204 in the remote control apparatus 2200 by radio waves.

The identifier determination unit 2403 determines whether or not the identifier extracted from the data received by the first reception unit 2401 via infrared radiation and the identifier extracted from the data received by the second reception unit 2402 via radio waves match. That is, the identifier determination unit 2403 determines whether or not the identifier received via infrared radiation and the identifier received via radio waves match. In more detail, for example, when the identifier is received via infrared radiation (see Step S501 in FIG. 24), the identifier determination unit 2403 stores the received identifier. Thus, the identifier determination unit 2403 stores the identifier transmitted from the first transmission unit 2203 in the remote control apparatus 2200 via infrared radiation, as a result of which the identifier transmitted from the first transmission unit 2203 is registered by the first transmission unit 2203. Subsequently, each time the user operates the remote control apparatus 2200 after the user operation of the remote control apparatus 2200 corresponding to this registration, the identifier determination unit 2403 determines whether or not the identifier (see Step S504) transmitted from the second transmission unit 2204 corresponding to the operation and the registered identifier received via infrared radiation match (see Step S505). When determining that the identifiers do not match (Step S505: No), that is, when determining that the identifier received via radio waves is not the identifier received from the remote control apparatus 2200, the identifier determination unit 2403 does not output the operation information received together with the identifier, to the operation information execution unit 2404. On the other hand, when determining that the identifiers match (Step S505: Yes), that is, when determining that the received identifier is the identifier received from the remote control apparatus 2200, the identifier determination unit 2403 outputs the operation information to the operation information execution unit 2404.

Note that the identifier determination unit 2403 may determine, upon the registration of the identifier transmitted via infrared radiation, whether or not the identifier transmitted via radio waves simultaneously with the identifier transmitted via infrared radiation matches the registered identifier. In this case, when determining that the two identifiers match, the identifier determination unit 2403 outputs the operation information to the operation information execution unit 2404.

Moreover, in a state where a previously registered identifier is stored in the identifier determination unit 2403 in advance, when the identifier determination unit 2403 receives a new identifier via infrared radiation (Step S501), the identifier determination unit 2403 may write the received identifier over the stored identifier. That is, the identifier determination unit 2403 may end the storage of the stored identifier, and start the storage of the newly received identifier.

Moreover, upon receiving the identifier via infrared radiation (Step S501), the first reception unit 2401 may transmit, to the remote control apparatus 2200, an instruction to transmit an encryption key for encrypting data to the first reception unit 2401 via infrared radiation. Upon receiving this transmitted instruction, the first transmission unit 2203 transmits a predetermined encryption key to the first reception unit 2401 via infrared radiation. The first reception unit 2401 receives the encryption key transmitted from the first transmission unit 2203. The operation information execution unit 2404 stores the received encryption key. When the identifier determination unit 2403 outputs the operation information to the operation information execution unit 2404 as a result of the determination based on the identifier registered in the identifier determination unit 2403 upon the storage of the encryption key, the operation information execution unit 2404 decrypts all or a part of the outputted operation information using the stored encryption key. The operation information execution unit 2404 then performs the process of the operation shown by the decrypted operation information.

Moreover, in the case where the identifier determination unit 2403 determines the match (Step S505: Yes), the first reception unit 2401 may transmit an address of the reception apparatus 2400 via infrared radiation. The first transmission unit 2203 in the remote control apparatus 2200 receives the transmitted address. The remote control apparatus 2200 stores the received address. Once the address has been stored in this way, the remote control apparatus 2200 instructs only the apparatus shown by the stored address to perform the process corresponding to the user operation on the remote control apparatus 2200. In detail, for example, the second transmission unit 2204 in the remote control apparatus 2200 detects an address of an apparatus receiving radio waves transmitted from the second transmission unit 2204, and determines whether or not the detected address matches the stored address. Only when determining that the detected address matches the stored address, the second transmission unit 2204 has the apparatus receive the operation information.

In this wireless remote control system 2, one apparatus (the reception apparatus 2400) obtains recognition information (identifier) via another communication path (infrared communication path) different from the wireless communication path (radio communication path) connecting the apparatus (the reception apparatus 2400) and the other apparatus (the remote control apparatus 2200). When a connected apparatus connected to the reception apparatus 2400 is identified by the obtained recognition information (identifier), that is, when the apparatus (the reception apparatus 2400) receives recognition information (identifier) matching the obtained recognition information (identifier), the apparatus (the reception apparatus 2400) specifies the connected apparatus as the other apparatus (the remote control apparatus 2200). The apparatus (the reception apparatus 2400) then sets data indicating this specification in the apparatus (the reception apparatus 2400), thereby enabling communication with the other apparatus (the remote control apparatus 2200). Thus, the identification information used when setting the connected apparatus as the other apparatus (the remote control apparatus 2200) to enable communication is obtained via another communication path (infrared communication path). Therefore, the use of appropriate identification information can be ensured easily, without requiring any complex switch operation and the like. This makes it easier to prevent a situation where an inappropriate apparatus is controlled by the wireless controlling apparatus (the remote control apparatus 2200), thereby easily ensuring that only the controlled apparatus (the reception apparatus 2400) is controlled.

Embodiment B2

The following describes a wireless remote control system in an embodiment B2 of the present invention, with reference to drawings.

Figure 25:
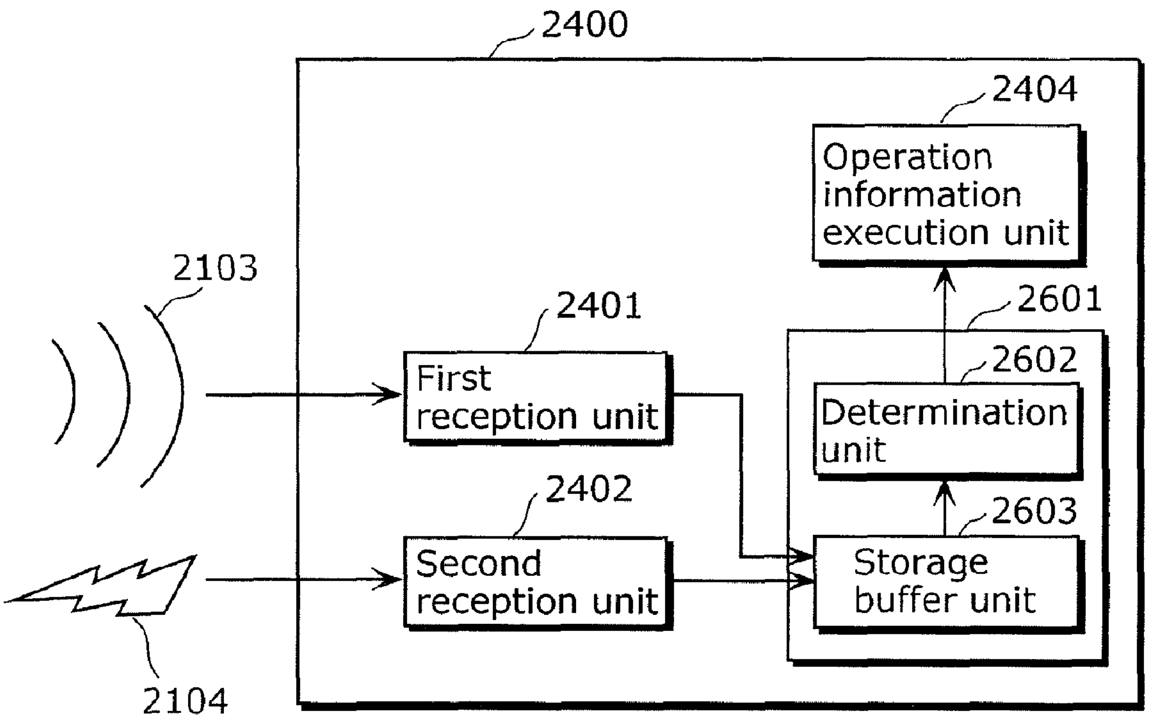
FIG. 25 is a block diagram showing an internal structure of a reception apparatus in an embodiment B2 of the present invention.

FIG. 25 is a block diagram of the reception apparatus 2400 in the embodiment B2 of the present invention. FIG. 25 shows the case where the reception apparatus 2400 stores each of the identifier obtained via the first communication medium 2103 and the identifier obtained via the second communication medium 2104 and determines whether or not the stored identifiers match.

The reception apparatus 2400 shown in FIG. 25 differs from the embodiment B1 in the following point. An identifier determination unit 2601 including a storage buffer unit 2603 and a determination unit 2602 is provided in the embodiment B2, in place of the identifier determination unit 2403.

Note that the same numerals as those in the embodiment B1 are used in the embodiment B2 for the sake of convenience.

When notified from the first reception unit 2401 that the first reception unit 2401 receives an identifier from the first communication medium 2103, the storage buffer unit 2603 obtains the identifier from the first communication medium 2103, and stores the obtained identifier. Moreover, when notified from the second reception unit 2402 that the second reception unit 2402 receives an identifier from the second communication medium 2104, the storage buffer unit 2603 obtains the identifier and operation information from the second communication medium 2104, and stores the obtained identifier and operation information. Once the identifier obtained via the first communication medium 2103 and the identifier obtained via the second communication medium 2104 have both been stored, the storage buffer unit 2603 notifies the determination unit 2602 of the storage. Note that, in the case where an identifier has already been held in the storage buffer unit 2603, the storage buffer unit 2603 may write an obtained identifier over the held identifier. Moreover, when storing an identifier, the user may set a storage period of the storage buffer unit 2603 in a predetermined setting unit in the reception apparatus 2400 so that the stored identifier is nullified or deleted when the storage period set by the user has elapsed or when the reception apparatus 2400 enters a standby state such as power off. In more detail, the storage buffer unit 2603 may, for example, perform the above nullification or the like when the storage period has elapsed from the start of the storage.

Upon receiving the notification from the storage buffer unit 2603, the determination unit 2602 reads the two identifiers, and determines whether or not the read two identifiers match. Only when identifying (determining) the match, the determination unit 2602 outputs the operation information to the operation information execution unit 2404. Note that the identifier determination unit 2601 may use any algorithm for determining the match.

The following describes an operation of the reception apparatus 2400 in the embodiment B2 of the present invention. The following description concerns the case where ultrasonic waves are used as the first communication medium 2103 and radio waves are used as the second communication medium 2104, with there being a difference in propagation speed between the communication media when the remote control apparatus 2200 transmits signals to the reception apparatus 2400.

Figure 26:
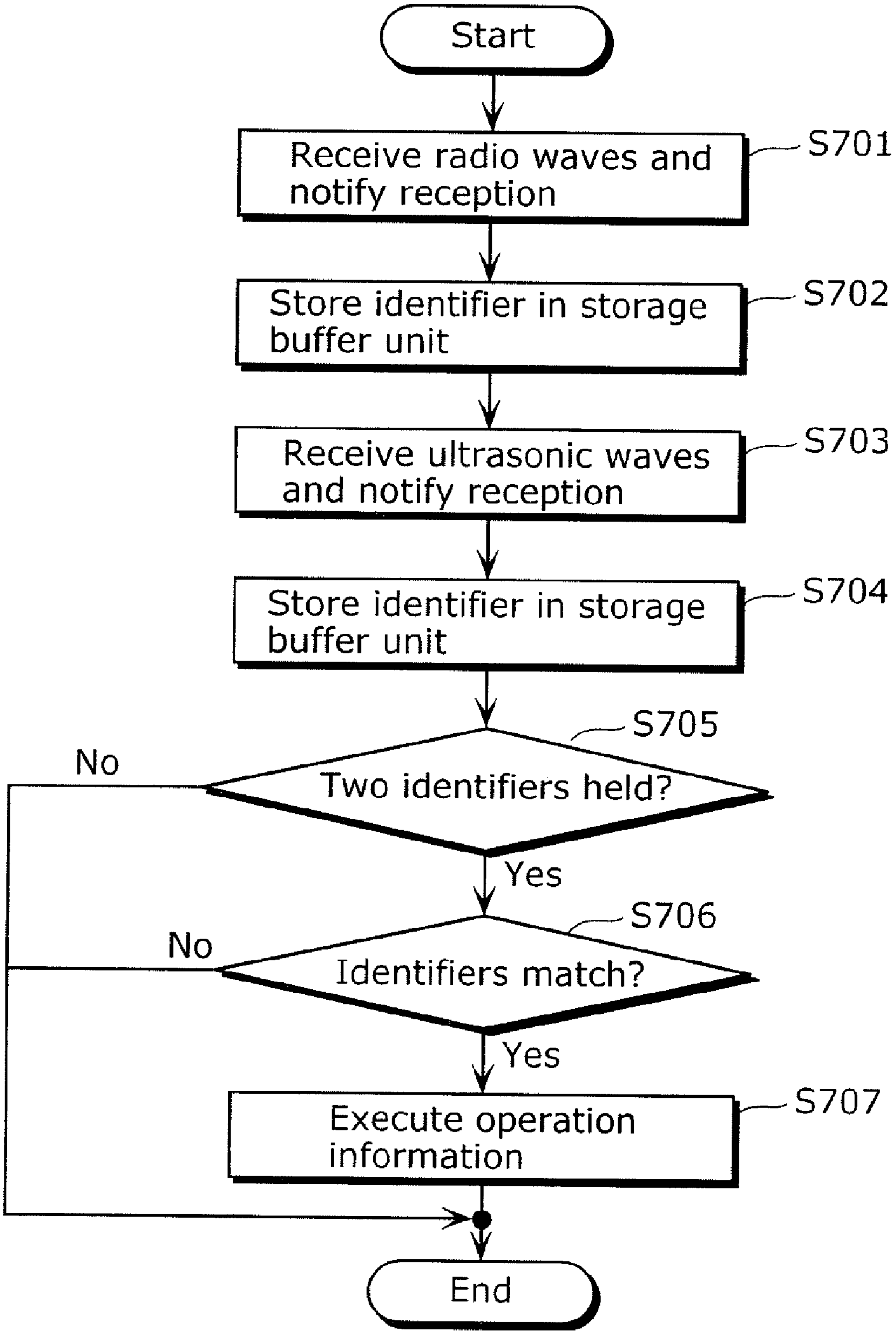
FIG. 26 is a flowchart showing an operation of the reception apparatus in the embodiment B2 of the present invention.

FIG. 26 is a flowchart showing the operation of the reception apparatus 2400 in the embodiment B2.

First, the reception apparatus 2400 receives, in the second reception unit 2402, radio waves of a higher propagation speed from the remote control apparatus 2200, and notifies the storage buffer unit 2603 of the reception (Step S701).

When notified of the radio wave reception by the second reception unit 2402, the storage buffer unit 2603 obtains (extracts) the identifier, and stores the obtained identifier (Step S702). In detail, for example, the storage buffer unit 2603 extracts the identifier included in the data received by the second reception unit 2402 via radio waves.

Next, the reception apparatus 2400 receives, in the first reception unit 2401, ultrasonic waves of a lower propagation speed transmitted from the remote control apparatus 2200 to the reception apparatus 2400, and notifies the storage buffer unit 2603 of the reception (Step S703).

When notified of the ultrasonic wave reception by the first reception unit 2401, the storage buffer unit 2603 obtains the identifier via the first communication medium 2103, and stores the obtained identifier (Step S704).

The storage buffer unit 2603 detects that the two identifiers are stored. Upon this detection, the storage buffer unit 2603 outputs the stored two identifiers to the determination unit 2602 (Step S705: Yes). When the two identifiers are not stored, the reception apparatus 2400 ends the operation of FIG. 26 (Step S705: No).

When notified from the storage buffer unit 2603 that the two identifiers are stored, the determination unit 2602 determines whether or not the two identifiers match. When identifying the match, the determination unit 2602 outputs the operation information obtained from radio waves, to the operation information execution unit 2404 (Step S706: Yes). When the identifiers do not match, on the other hand, the reception apparatus 2400 ends the operation (Step S706: No).

The operation information execution unit 2404 obtains the operation information outputted from the determination unit 2602, and executes the process of the operation shown by the obtained operation information. The reception apparatus 400 then ends the operation (Step S707).

Ultrasonic waves are used as the first communication medium 2103 and radio waves are used as the second communication medium 2104 in the embodiment B2. However, the present invention is not limited to ultrasonic waves and radio waves, so long as two communication media differ in propagation speed.

According to the embodiment B2 of the present invention, even in the case where, for example, the first communication medium 2103 and the second communication medium 2104 differ in propagation speed, it is possible to automatically identify only the target remote control apparatus. Hence, there is no need to perform presetting such as a switching operation or installation/setup for specifying the remote control apparatus.

The wireless control system (the remote control system 1, the wireless remote control system 2) is configured in this way.

(1) The wireless control system in each of the embodiments A, B1, and B2 is a wireless control system (the remote control system 1, the wireless remote control system 2) including: a controlled apparatus (the TV 12, the DVR 13, the reception apparatus 2400); and a wireless controlling apparatus (the remote control 11, the remote control apparatus 2200) that controls the controlled apparatus via a wireless communication path. One (the remote control 11, the reception apparatus 2400) of the controlled apparatus and the wireless controlling apparatus includes: an obtainment unit (the wireless reception unit 114, the first reception unit 2401) that obtains recognition information (pairing information (category, address, encryption key), identifier) used by the apparatus to uniquely recognize an other one (the DVR 13, the remote control apparatus 2200) of the controlled apparatus and the wireless controlling apparatus, via another communication path (the communication path between the DVR 13 and the remote control 11 through the TV 12, the communication path of the first communication medium 2103) different from the wireless communication path connecting the apparatus and the other apparatus; and a setting unit (the control circuit 115, the identifier determination unit 2403) that, when a connected apparatus recognized via the wireless communication path is identified by the obtained recognition information, sets the connected apparatus as the other apparatus to enable communication with the connected apparatus.

In this wireless control system, one apparatus obtains recognition information via another communication path different from the wireless communication path connecting the apparatus and the other apparatus. When a connected apparatus is identified by the obtained recognition information, the apparatus sets the connected apparatus as the other apparatus to enable communication with the connected apparatus. By obtaining the recognition information, which is used when setting the connected apparatus as the other apparatus to enable communication, via another communication path, the use of appropriate recognition information can be ensured easily. This makes it easier to prevent a situation where an inappropriate apparatus is controlled by the wireless controlling apparatus, thereby easily ensuring that only the controlled apparatus is controlled.

Note that the apparatus may determine whether or not the target apparatus is connected to the apparatus, that is, whether or not the target apparatus is the connected apparatus, in order to recognize the target apparatus as the connected apparatus. The apparatus may perform first recognition of recognizing that the apparatus is the connected apparatus and second recognition of recognizing that the target apparatus (connected apparatus) subject to the first recognition is the other apparatus. In detail, the apparatus may specify, in the second recognition, that the target apparatus (connected apparatus) subject to the first recognition is the other apparatus. When specifying this, the apparatus may set information showing the specification in a functional unit such as a setting unit included in the apparatus, thereby enabling communication between the apparatus and the connected apparatus. The apparatus may be prohibited from data communication with the target apparatus when only the first recognition is made for the target apparatus and the second recognition is not made for the target apparatus, and allowed to perform data communication only after the second recognition is made. The apparatus and the other apparatus may be allowed to communicate a command only after the second recognition is made.

In detail, in this wireless control system, for example, the other apparatus is the second controlled apparatus (the DVR 13). Moreover, for example, the other communication path is a communication path through which second recognition information of the second controlled apparatus is outputted from the second controlled apparatus to the first controlled apparatus and the outputted second recognition information is outputted from the first controlled apparatus to the wireless controlling apparatus. Alternatively, for example, the other communication path is a communication path of the first communication medium transmittable only within the range of sight. By employing any of these structures, the other communication path can be provided easily. Hence, the use of appropriate recognition information can be ensured relatively easily without requiring an operation of pressing a switch or the like, when compared with a method of not using the other communication path.

Note that, in most cases the switch pressing operation or the like is performed not by a manufacturer of the wireless control system but by a customer who uses the wireless control system. Therefore, the manufacturer strongly desires to eliminate the need for such an operation.

In this wireless control system, the communication path other than the wireless communication path through which the wireless controlling apparatus controls the controlled apparatus is used for obtaining the recognition information. This makes it possible to freely select the wireless communication path, irrespective of the obtainment of the recognition information. In detail, a wireless communication path (such as an omnidirectional wireless communication path) with lower directionality can be selected. As an example, a wireless communication path by radio waves can be selected. A wireless communication path by radio waves has low directionality. Hence, while ensuring the advantage of being able to perform control by the wireless communication path without directing the wireless controlling apparatus in a predetermined direction, the obtainment of the recognition information can be performed not via the wireless communication path of radio waves having a wide transmission range.

In the case where the wireless communication path is a wireless communication path of radio waves, the communication on the wireless communication path often penetrates walls and is received outside the walls. For instance, there is a possibility that a third party or the like outside the walls controls the controlled apparatus wrongly. In the wireless control system described above, however, the recognition information is obtained via another communication path different from the wireless communication path, so that such wrong control can be suppressed. In other words, it can be ensured that only the wireless controlling apparatus controls the controlled apparatus.

(2) The wireless control system of the above (1) includes: a first controlled apparatus (the TV 12); and a second controlled apparatus (the DVR 13). The first controlled apparatus (the TV 12) has first recognition information (pairing information: category, address, encryption key) which is recognition information used by a communication apparatus (such as the wireless controlling apparatus) different from the first controlled apparatus to uniquely recognize the first controlled apparatus. The second controlled apparatus (the DVR 13) has second recognition information which is recognition information used by a communication apparatus (such as the wireless controlling apparatus) different from the second controlled apparatus to uniquely recognize the second controlled apparatus. The second controlled apparatus (the DVR 13) outputs the second recognition information to the first controlled apparatus (the TV 12) when the first controlled apparatus and the second controlled apparatus (the DVR 13) are connected to each other, in a case where the wireless controlling apparatus is able to communicate with the first controlled apparatus (the TV 12) according to the first recognition information. The first controlled apparatus outputs the second recognition information to the wireless controlling apparatus (the remote control 11). The wireless controlling apparatus enables communication with the second controlled apparatus (the DVR 13) recognized via the wireless communication path (the other communication path), according to the second recognition information outputted from the first controlled apparatus (the TV 12). The other communication path is composed of two communication paths that are a communication path between the first controlled apparatus (the TV 12) and the second controlled apparatus (the DVR 13) and the wireless communication path between the first controlled apparatus (the TV 12) and the wireless controlling apparatus (the remote control 11) (embodiment A).

(3) In the wireless control system of the above (2), when the first controlled apparatus and the second controlled apparatus are connected to each other, the second controlled apparatus (the DVR 13) outputs the second recognition information to the first controlled apparatus (the TV 12). The first controlled apparatus stores the second recognition information in the connected apparatus information register 129. When the wireless controlling apparatus and the first controlled apparatus communicate the first recognition information via the wireless communication path, the first controlled apparatus outputs the first recognition information and the second recognition information to the wireless controlling apparatus (embodiments A, B1, B2).

(4) In the wireless control system of the above (2) or (3), the recognition information is information that includes at least addresses and encryption keys of the plurality of controlled apparatuses.

(5) In the wireless control system of one of the above (2) to (4), the first controlled apparatus (the TV 12) includes a display unit (the display 133). The first controlled apparatus (the TV 12) selectively displays first visual information and second visual information. The first visual information includes at least a moving image and a still image generated in the first controlled apparatus, and the second visual information includes at least a moving image and a still image generated in the second controlled apparatus (the DVR 13). When the first visual information is displayed on the display unit, the wireless controlling apparatus communicates with the first controlled apparatus (the TV 12) and does not communicate with a controlled apparatus (such as the DVR 13) different from the first controlled apparatus (the TV 12).

(6) In the wireless control system of the above (5), when communicating with the wireless controlling apparatus while the second visual information by the second controlled apparatus (the DVR 13) is displayed, the first controlled apparatus outputs the second recognition information which is outputted from the second controlled apparatus to the first controlled apparatus, to the wireless controlling apparatus.

(7) In the wireless control system of the above (6), the second controlled apparatus (the DVR 13) determines visual information displayed on the display unit. When determining that the visual information displayed on the display unit is the first visual information by the first controlled apparatus (the TV 12), the second controlled apparatus rejects communication information outputted from the wireless controlling apparatus.

(8) In a pairing method of a wireless control system including a plurality of controlled apparatuses and a wireless controlling apparatus that controls the plurality of controlled apparatuses via a wireless communication path, a first controlled apparatus of the plurality of controlled apparatuses has first recognition information which is recognition information used by a communication apparatus (such as the wireless controlling apparatus) different from the first controlled apparatus to uniquely recognize the first controlled apparatus. A second controlled apparatus of the plurality of controlled apparatuses that is different from the first controlled apparatus has second recognition information which is recognition information used by a communication apparatus (such as the wireless controlling apparatus) different from the second controlled apparatus to uniquely recognize the second controlled apparatus. The pairing method includes: outputting, by the second controlled apparatus, the second recognition information to the first controlled apparatus when the first controlled apparatus and the second controlled apparatus are connected to each other, in a case where the wireless controlling apparatus is able to communicate with the first controlled apparatus according to the first recognition information; outputting, by the first controlled apparatus, the second recognition information to the wireless controlling apparatus; and enabling, by the wireless controlling apparatus, communication with the second controlled apparatus recognized via the wireless communication path (the other communication path), according to the second recognition information outputted from the first controlled apparatus.

(9) In the wireless control system (the wireless remote control system 2) of the above (1), the controlled apparatus (the reception apparatus 2400) identifies the wireless controlling apparatus (the remote control apparatus 2200). The wireless controlling apparatus includes: a first transmission unit (the first transmission unit 2203) that transmits recognition information (identifier) indicating the wireless controlling apparatus via a first communication medium (the first communication medium 2103) transmittable only within a range of sight, upon detecting that an operation of a button provided on the wireless controlling apparatus is performed; and a second transmission unit (the second transmission unit 2204) that transmits the recognition information and operation information for operating the controlled apparatus, via a second communication medium (the second communication medium 2104). The controlled apparatus includes: a first obtainment unit (the first reception unit 2401) that obtains the recognition information transmitted from the wireless controlling apparatus via the first communication medium; a second obtainment unit (the second reception unit 2402) that obtains the recognition information transmitted from the wireless controlling apparatus via the second communication medium; and a recognition information determination unit (the identifier determination unit 2403) that determines whether or not the recognition information obtained by the first obtainment unit and the recognition information obtained by the second obtainment unit match, thereby identifying a transmitter. The other communication path is a communication path using the first communication medium (the first communication medium 2103) (embodiments B1, B2).

(10) In the wireless control system of the above (9), infrared radiation is used as the first communication medium, and radio waves are used as the second communication medium.

(11) The wireless control system (the wireless remote control system 2) of the above (1) includes: the wireless controlling apparatus (the remote control apparatus 2200) that transmits operation information corresponding to a key operation; and the controlled apparatus (the reception apparatus 2400) that receives the operation information transmitted from the wireless controlling apparatus. The wireless controlling apparatus includes: at least one operation key; an operation information generation unit (the operation information generation unit 2201) that, upon detecting that an operation of the operation key is performed, generates operation information corresponding to the operation key; a recognition information holding unit (the identifier holding unit 2202) that holds recognition information indicating a generator of the operation information; a first transmission unit (the first transmission unit 2203) that transmits the recognition information via a first communication medium transmittable only within a range of sight; and a second transmission unit (the second transmission unit 2204) that transmits the recognition information and the operation information via a second communication medium. The controlled apparatus includes: a first reception unit (the first reception unit 2401) that receives the recognition information indicating the wireless controlling apparatus, via the first communication medium; a second reception unit (the second reception unit 2402) that receives the operation information and the recognition information transmitted from the wireless controlling apparatus via the second communication medium; a recognition information determination unit (the identifier determination unit 2601) that obtains the recognition information via the first communication medium and the recognition information via the second communication medium, and determines whether or not the recognition information obtained via the first communication medium and the recognition information obtained via the second communication medium match, thereby identifying a transmitter; and an operation execution unit (the operation information execution unit 2404) that executes an operation corresponding to the operation information received via the second communication medium, when the recognition information determination unit determines that the recognition information obtained via the first communication medium and the recognition information obtained via the second communication medium match. The apparatus is the controlled apparatus, the other apparatus is the wireless controlling apparatus, and the other communication path is a communication path using the first communication medium.

(12) In the wireless control system of the above (11), infrared radiation is used as the first communication medium in the wireless controlling apparatus, and radio waves are used as the second communication medium in the wireless controlling apparatus.

(13) In the wireless control system of the above (11) or (12), the recognition information determination unit in the controlled apparatus stores, by the storage buffer unit 2603, the recognition information obtained via the first communication medium and the recognition information obtained via the second communication medium. The recognition information determination unit then determines, by the determination unit 2602, whether or not the stored recognition information obtained via the first communication medium and the stored recognition information obtained via the second communication medium match, thereby identifying the transmitter.

(14) In the wireless control system of the above (2), the first controlled apparatus may identify the wireless controlling apparatus. Here, the wireless controlling apparatus includes: a first transmission unit that transmits recognition information indicating the wireless controlling apparatus via a first communication medium transmittable only within a range of sight, upon detecting that an operation of a button provided on the wireless controlling apparatus is performed; and a second transmission unit that transmits the recognition information and operation information for operating the controlled apparatus, via a second communication medium. The first controlled apparatus includes: a first obtainment unit that obtains the recognition information transmitted from the wireless controlling apparatus via the first communication medium; a second obtainment unit that obtains the recognition information transmitted from the wireless controlling apparatus via the second communication medium; and a recognition information determination unit that determines whether or not the recognition information obtained by the first obtainment unit and the recognition information obtained by the second obtainment unit match, thereby identifying a transmitter. The wireless controlling apparatus recognizes the first controlled apparatus, when the recognition information determination unit in the first controlled apparatus identifies the wireless controlling apparatus. The second controlled apparatus outputs the second recognition information to the first controlled apparatus when the first controlled apparatus and the second controlled apparatus are connected to each other, in a case where the wireless controlling apparatus recognizes the first controlled apparatus as a result of the recognition information determination unit in the first controlled apparatus identifying the wireless controlling apparatus.

Furthermore, the functions described in the above embodiments A, B1, and B2 may be appropriately added to this wireless control system.

INDUSTRIAL APPLICABILITY

The present invention is applicable to a remote control, and in particular applicable to a remote control that allows the user to operate an apparatus more easily by eliminating the need of pairing for the second apparatus and beyond, and also by selecting an appropriate apparatus in the case where the remote control controls a plurality of apparatuses.

In the identification method according to the present invention, the identifier superimposed on the first communication medium and the identifier superimposed on the second communication medium are compared before executing the operation information, with it being possible to automatically identify the generator of the operation information. This makes it unnecessary to perform, in the receiver, presetting such as a switching operation or installation/setup of, for example, having the receiver hold the identifier for specifying the transmitter, and the advantage of being able to automatically execute only intended operation information can be attained. Therefore, the present invention can be applied to an electronic appliance and the like which are remotely controllable, such as a TV and a DVD recorder, when only the target reception apparatus needs to be operated.

Moreover, in this wireless control system, one apparatus obtains recognition information via another communication path different from the wireless communication path connecting the apparatus and the other apparatus. When a connected apparatus is identified by the obtained recognition information, the apparatus sets the connected apparatus as the other apparatus to enable communication with the connected apparatus. By obtaining the recognition information, which is used when setting the connected apparatus as the other apparatus to enable communication, via another communication path, the use of appropriate recognition information can be ensured easily by, for example, eliminating the need for a complex switch operation. This makes it easier to prevent a situation where an inappropriate apparatus is controlled by the wireless controlling apparatus, thereby easily ensuring that only the controlled apparatus is controlled.

The invention claimed is:

1. A wireless control system comprising:

a controlled apparatus; and a wireless controlling apparatus that controls said controlled apparatus via a wireless communication path, wherein one of said controlled apparatus and said wireless controlling apparatus obtains recognition information for uniquely recognizing an other one of said controlled apparatus and said wireless controlling apparatus, via a communication path different from the wireless communication path connecting said apparatus and said other apparatus, when a connected apparatus recognized via the wireless communication path is identified by the obtained recognition information, said apparatus sets the connected apparatus as said other apparatus to enable communication with the connected apparatus, and said wireless control system further comprises:

a first controlled apparatus; and a second controlled apparatus, wherein said first controlled apparatus has first recognition information which is recognition information used by a communication apparatus different from said first controlled apparatus to uniquely recognize said first controlled apparatus, said second controlled apparatus has second recognition information which is recognition information used by a communication apparatus different from said second controlled apparatus to uniquely recognize said second controlled apparatus, said second controlled apparatus outputs the second recognition information to said first controlled apparatus when said first controlled apparatus and said second controlled apparatus are connected to each other, in a case where said wireless controlling apparatus is able to communicate with said first controlled apparatus according to the first recognition information, said first controlled apparatus outputs the second recognition information to said wireless controlling apparatus, said wireless controlling apparatus enables communication with said second controlled apparatus recognized via the wireless communication path, according to the second recognition information outputted from said first controlled apparatus, and the different communication path is composed of two communication paths that are a communication path between said first controlled apparatus and said second controlled apparatus and the wireless communication path between said first controlled apparatus and said wireless controlling apparatus.

2. The wireless control system according to claim 1, wherein, when said first controlled apparatus and said second controlled apparatus are connected to each other, said second controlled apparatus outputs the second recognition information to said first controlled apparatus, and said first controlled apparatus stores the second recognition information, and when said wireless controlling apparatus and said first controlled apparatus communicate the first recognition information via the wireless communication path, said first controlled apparatus outputs the first recognition information and the second recognition information to said wireless controlling apparatus.

3. The wireless control system according to claim 2, wherein the recognition information is information that includes at least addresses and encryption keys of a plurality of said controlled apparatuses.

4. The wireless control system according to claim 3, wherein said first controlled apparatus includes a display unit, said first controlled apparatus selectively displays first visual information and second visual information, the first visual information including at least a moving image and a still image generated in said first controlled apparatus, and the second visual information including at least a moving image and a still image generated in said second controlled apparatus, and when the first visual information is displayed on said display unit, said wireless controlling apparatus communicates with said first controlled apparatus and does not communicate with a controlled apparatus different from said first controlled apparatus.

5. The wireless control system according to claim 4, wherein, when communicating with said wireless controlling apparatus while the second visual information is displayed, said first controlled apparatus outputs the second recognition information to said wireless controlling apparatus.

6. The wireless control system according to claim 5, wherein said first controlled apparatus determines visual information displayed on said display unit and, when determining that the visual information displayed on said display unit is the second visual information, rejects communication information outputted from said wireless controlling apparatus.

7. A pairing method of a wireless control system including a plurality of controlled apparatuses and a wireless controlling apparatus that controls the plurality of controlled apparatuses via a wireless communication path, wherein a first controlled apparatus of the plurality of controlled apparatuses has first recognition information which is recognition information used by a communication apparatus different from the first controlled apparatus to uniquely recognize the first controlled apparatus, and a second controlled apparatus of the plurality of controlled apparatuses that is different from the first controlled apparatus has second recognition information which is recognition information used by a communication apparatus different from the second controlled apparatus to uniquely recognize the second controlled apparatus, said pairing method comprising:

obtaining, by the first controlled apparatus, the second recognition information from the second controlled apparatus when the first controlled apparatus and the wireless controlling apparatus are connected to each other according to the first recognition information, in a case where a wired connection of the second controlled apparatus is detected;

outputting, by the first controlled apparatus, the second recognition information to the wireless controlling apparatus; and enabling, by the wireless controlling apparatus, communication with the second controlled apparatus recognized via the wireless communication path, according to the second recognition information outputted from the first controlled apparatus.

8. The wireless control system according to claim 1, wherein said first controlled apparatus identifies said wireless controlling apparatus, said wireless controlling apparatus includes:

a first transmission unit configured to transmit recognition information indicating said wireless controlling apparatus via a first communication medium transmittable only within a range of sight, upon detecting that an operation of a button provided on said wireless controlling apparatus is performed; and a second transmission unit configured to transmit the recognition information and operation information for operating said first controlled apparatus, via a second communication medium, said first controlled apparatus includes:

a first obtainment unit configured to obtain the recognition information transmitted from said wireless controlling apparatus via the first communication medium;

a second obtainment unit configured to obtain the recognition information transmitted from said wireless controlling apparatus via the second communication medium; and a recognition information determination unit configured to determine whether or not the recognition information obtained by said first obtainment unit and the recognition information obtained by said second obtainment unit match, thereby identifying a transmitter, said wireless controlling apparatus recognizes said first controlled apparatus, when said recognition information determination unit in said first controlled apparatus identifies said wireless controlling apparatus, and said second controlled apparatus outputs the second recognition information to said first controlled apparatus when said first controlled apparatus and said second controlled apparatus are connected to each other, in a case where said wireless controlling apparatus recognizes said first controlled apparatus as a result of said recognition information determination unit in said first controlled apparatus identifying said wireless controlling apparatus.

9. A wireless control system comprising:

a controlled apparatus; and a wireless controlling apparatus that controls said controlled apparatus via a wireless communication path, wherein one of said controlled apparatus and said wireless controlling apparatus obtains recognition information for uniquely recognizing an other one of said controlled apparatus and said wireless controlling apparatus, via a communication path different from the wireless communication path connecting said apparatus and said other apparatus, when said other apparatus which can be identified by the obtained recognition information is present in a plurality of connected apparatuses recognized via the wireless communication path, said apparatus is set to communicate with said other apparatus according to the recognition information, and said controlled apparatus comprises:

a first controlled apparatus; and a second controlled apparatus, wherein said first controlled apparatus has first recognition information which is recognition information used by a communication apparatus different from said first controlled apparatus to uniquely recognize said first controlled apparatus, said second controlled apparatus has second recognition information which is recognition information used by a communication apparatus different from said second controlled apparatus to uniquely recognize said second controlled apparatus, one of said first controlled apparatus and said second controlled apparatus controls such that said first controlled apparatus holds the second recognition information when said first controlled apparatus and said second controlled apparatus are connected to each other, in a case where said wireless controlling apparatus is able to communicate with said first controlled apparatus according to the first recognition information, said first controlled apparatus outputs the second recognition information to said wireless controlling apparatus, said wireless controlling apparatus enables communication with said second controlled apparatus recognized via the wireless communication path, according to the second recognition information outputted from said first controlled apparatus, and the different communication path includes a communication path between said first controlled apparatus and said second controlled apparatus and a communication path between said first controlled apparatus and said wireless controlling apparatus.

10. A wireless control system according to claim 9, wherein, in the different communication path, a communication path between said first controlled apparatus and said wireless controlling apparatus is a wireless communication path.

* * * * *